US012799815B2

(12) United States Patent
Chen et al.

(10) Patent No.: US 12,799,815 B2
(45) Date of Patent: Nov. 17, 2026

(54) PULL-ROD MECHANISM AND WINDOW COVERING HAVING SAME

(71) Applicant: Nien Made Enterprise Co., Ltd., Taichung City (TW)

(72) Inventors: Lin Chen, Taichung City (TW); Jingjing Yang, Taichung City (TW)

(73) Assignee: Nien Made Enterprise Co., Ltd., Taichung City (TW)

( * ) Notice: Subject to any disclaimer, the term of this patent is extended or adjusted under 35 U.S.C. 154(b) by 6 days.

(21) Appl. No.: 19/260,295

(22) Filed: Jul. 4, 2025

(65) Prior Publication Data

US 2026/0110214 A1 Apr. 23, 2026

(30) Foreign Application Priority Data

Oct. 21, 2024 (CN) ........................ 202422540262.9

(51) Int. Cl.
*E06B 9/42* (2006.01)
*E06B 9/50* (2006.01)
*E06B 9/78* (2006.01)

(52) U.S. Cl.
CPC .................. *E06B 9/42* (2013.01); *E06B 9/50* (2013.01); *E06B 9/78* (2013.01)

(58) Field of Classification Search
CPC ..... E06B 9/88; E06B 9/76; E06B 9/78; E06B 9/56; E06B 9/42; E06B 9/40; E06B 9/326; E06B 9/322; E06B 2009/3222; E06B 2009/785
See application file for complete search history.

(56) References Cited

U.S. PATENT DOCUMENTS

| | | | | |
|---|---|---|---|---|
| 7,128,126 | B2 * | 10/2006 | Smith ...................... | E06B 9/262 160/84.05 |
| 7,578,334 | B2 * | 8/2009 | Smith ...................... | E06B 9/42 160/84.05 |
| 7,665,507 | B2 * | 2/2010 | Naoki ...................... | E06B 9/78 160/170 |
| 8,186,413 | B2 * | 5/2012 | Fujita ...................... | E06B 9/34 160/319 |

(Continued)

FOREIGN PATENT DOCUMENTS

| | | |
|---|---|---|
| AU | 2013385670 B2 | 11/2018 |
| CN | 221779349 U | 9/2024 |

(Continued)

*Primary Examiner* — Johnnie A. Shablack
(74) *Attorney, Agent, or Firm* — Winston Hsu

(57) ABSTRACT

A pull-rod mechanism includes a drive connector, a pull rod, a lift mechanism, and an actuating mechanism. The pull rod includes a fixed shaft, an unlocking shaft and a lift operating member. When the lift operating member protrudes relative to the unlocking shaft, the lift mechanism drives the actuating mechanism to transmit a torque to the roller for winding up the covering material. When the unlocking shaft protrudes relative to the fixed shaft, the lift mechanism drives a drive shaft of the actuating mechanism to rotate reversely, causing the engagement between the swinging pawls of the actuating mechanism and the drive connector to discontinue. Thereby, the drive connector and the roller rotate freely relative to the drive shaft under a weight of the covering material, unwinding the covering material so that the covering material is extended from the roller.

13 Claims, 18 Drawing Sheets

(56) References Cited

U.S. PATENT DOCUMENTS

| | | | | |
|---|---|---|---|---|
| 8,191,605 | B2 * | 6/2012 | Kwak | E06B 9/42 160/319 |
| 8,356,653 | B2 * | 1/2013 | Fu-Lai | E06B 9/322 160/84.05 |
| 8,844,605 | B2 * | 9/2014 | Ng | E06B 9/78 192/81 C |
| 9,181,750 | B2 * | 11/2015 | Ticoalu | E06B 9/262 |
| 9,284,774 | B2 * | 3/2016 | Yu | E06B 9/322 |
| 9,482,050 | B2 * | 11/2016 | Strand | E06B 9/50 |
| 9,657,517 | B2 * | 5/2017 | Huang | E06B 9/32 |
| 9,890,588 | B2 * | 2/2018 | Smith | E06B 9/74 |
| 10,012,020 | B2 * | 7/2018 | Li | F16D 43/02 |
| 10,329,840 | B2 | 6/2019 | Diamond | |
| 10,407,983 | B2 * | 9/2019 | Holt | E06B 9/90 |
| 11,293,220 | B2 * | 4/2022 | Cheng | E06B 9/322 |
| 11,492,845 | B2 * | 11/2022 | Cheng | E06B 9/262 |
| 11,859,447 | B2 * | 1/2024 | Brown | E06B 9/06 |
| 11,927,058 | B2 * | 3/2024 | Lee | E06B 9/34 |
| 12,129,713 | B2 * | 10/2024 | Kim | E06B 9/42 |
| 12,320,196 | B2 * | 6/2025 | Wang | E06B 9/78 |
| 12,428,907 | B1 * | 9/2025 | Lu | E06B 9/78 |
| 12,473,780 | B2 * | 11/2025 | Huang | E06B 9/322 |
| 12,503,913 | B2 * | 12/2025 | Lee | E06B 9/68 |
| 2014/0216668 | A1 * | 8/2014 | Kim | E06B 9/42 160/322 |
| 2015/0354275 | A1 * | 12/2015 | Huang | F16H 31/007 160/368.1 |
| 2016/0281423 | A1 * | 9/2016 | Kao | E06B 9/42 |
| 2024/0110439 | A1 * | 4/2024 | Colson | E06B 9/32 |
| 2024/0328253 | A1 | 10/2024 | Wang | |
| 2025/0250851 | A1 * | 8/2025 | Chen | E06B 9/42 |
| 2026/0226795 | A1 * | 8/2026 | Spray | E06B 9/322 |

FOREIGN PATENT DOCUMENTS

| | | | | |
|---|---|---|---|---|
| JP | 40-2156 | | | 1/1965 |
| JP | 7-40988 | | | 7/1995 |
| JP | 2006-241692 | A | | 9/2006 |
| JP | 2018-71347 | A | | 5/2018 |
| JP | 2019082224 | A | * | 5/2019 |

* cited by examiner

PULL-ROD MECHANISM AND WINDOW COVERING HAVING SAME

BACKGROUND OF THE DISCLOSURE

1. Field of the Disclosure

The present disclosure generally relates to a pull-rod mechanism and a window covering having the same, and more particularly to a compact pull-rod mechanism capable of resisting greater torque, thereby reducing constraints on appearance design and enabling application to window coverings with greater width.

2. Description of the Prior Art

Window coverings are generally applied to the openings of architectures, e.g., windows or doors, for regulating light beams or improve privacy. Depending on an operation manner, a typical window covering with a light-shielding portion vertically adjustable in size can be a corded type (i.e., with an exposed operating cord) or a cordless type (i.e., without an exposed operating cord). One variation of the corded type of window covering is operated using a continuous cord loop for controlling retraction and extension of the window covering. The user can raise or lower the light-shielding portion of the window covering by pulling down the two sides of the cord loop, respectively. However, children may accidentally thread their heads through the cord loop, causing the cord loop to entangle around their necks.

For enhancing safety, there is currently a cordless type of window covering having an operating tube and a pull component which is located below the operating tube for controlling retraction and extension of the window covering. When the window covering is in a retracted state, the user can pull the operating tube to downwardly extend the window covering, or repeatedly drag the pull component to upwardly retract the window covering. However, this type of window covering has a large-sized mechanism inside the upper rail, resulting in constraints on the overall appearance design of the widow covering. Moreover, such a mechanism only uses one stop spring to tighten around a rotary sleeve for locking the rotary sleeve and preventing it from rotating under the weight of the slats, thereby having limited capability of resisting torque and being unsuitable for applying to window coverings which have greater width or heavier light-shielding portions. In view of this, a pull-rod type window covering which can resist greater torque and has a compact operating mechanism at the same time, is needed on the market.

SUMMARY OF THE DISCLOSURE

In light of the above-mentioned problems, the present disclosure provides a pull-rod mechanism and a window covering to which the pull-rod mechanism is applied. The pull-rod mechanism is capable of resisting greater torque with a more compact volume, thereby imposing fewer constraints on the overall appearance design of the window covering and enabling application to window coverings with greater width. Benefitting from the use of such a mechanism, the window covering has fewer limitations in both appearance design and width dimension.

The window covering comprises a roller and a covering material, in which an end of the covering material is connected to the roller. The pull-rod mechanism comprises a drive connector, a base, a pull rod, a lift mechanism, an unlocking mechanism, and an actuating mechanism. The drive connector is fixedly connected to an end of the roller. When the drive connector rotates, it drives the roller to rotate together. An inner surface of the drive connector is provided with at least one first abutting portion formed in a protruding shape. The base is disposed to correspond to the end of the roller where the drive connector is fixedly connected to. The pull rod is disposed below the base and comprises a fixed shaft, an unlocking shaft, and a lift operating member. The fixed shaft is fixedly connected to the base, while the unlocking shaft is retractably disposed at the bottom of the fixed shaft. Moreover, the lift operating member is connected to the bottom of the unlocking shaft and is retractable with respect to the unlocking shaft.

The lift mechanism is disposed within the base and in mechanical communication with the lift operating member through a lift cord. The lift mechanism comprises an annular cord wheel, a rewinding unit, and a driven member. The annular cord wheel can rotate around an axial direction of the roller, and an inside circumferential surface of the annular cord wheel is formed with plural second abutting portions. The rewinding unit is operatively connected with the annular cord wheel, serving to drive the annular cord wheel to rotate after the annular cord wheel stops being subjected to force, so that the annular cord wheel can be reset. The driven member is coaxially disposed with the annular cord wheel within the base, and the outer periphery of the driven member is formed with plural teeth. Moreover, the driven member comprises plural elastic arms corresponding to the second abutting portions in location, respectively. One end of the lift cord is fixedly connected to the annular cord wheel. The other end of the lift cord extends out from the base into the pull rod and is fixedly connected to the lift operating member. When the lift operating member is subjected to force and thereby protrudes with respect to the unlocking shaft, the lift cord moves with the lift operating member, thereby driving the annular cord wheel to rotate in a forward direction.

The unlocking mechanism is disposed within the base and in mechanical communication with the unlocking shaft of the pull rod through an unlocking cord. The unlocking mechanism comprises a moving member movably disposed within the base, and the moving member has a pushing portion. One end of the unlocking cord is fixedly connected to the moving member. The other end of the unlocking cord extends from the base into the pull rod and is fixedly connected to the unlocking shaft. When the unlocking shaft is subjected to force and thereby protrudes with respect to the fixed shaft, the unlocking cord moves with the unlocking shaft and thereby drives the moving member to move in a first direction, making the pushing portion of the moving member engage with the plural teeth on the outer periphery of the driven member and thereby making the driven member rotate in a reverse direction opposite to the forward direction.

The actuating mechanism is connected between the lift mechanism and the drive connector, comprising a drive shaft extending along the axial direction of the roller and at least one swinging pawl. One end of the drive shaft extends into the drive connector, while the other end of it is fixedly connected to the driven member, such that the drive shaft can rotate in the same direction as the driven member concurrently. The at least one swinging pawl is swingably disposed between the drive shaft and the drive connector.

When the lift operating member is subjected to force and thereby makes the annular cord wheel rotate in the forward direction, the elastic arms abut against the second abutting portions on the inside circumferential surface of the annular cord wheel respectively, making the driven member rotate in the forward direction along with the annular cord wheel and thereby making the drive shaft of the actuating mechanism rotate in the forward direction at the same time. As a result, the at least one swinging pawl engages with the at least one first abutting portion of the drive connector and transmits a torque to the roller, so that the roller winds up and retracts the covering material. After the lift operating member stops being subjected to force, the rewinding unit drives the annular cord wheel to rotate in the reverse direction, during which the elastic arms of the driven member skid over tops of the second abutting portions, and the annular cord wheel does not drive the driven member to rotate.

On the other hand, when the unlocking shaft is subjected to force and thereby protrudes with respect to the fixed shaft and makes the driven member rotate in the reverse direction, the driven member drives the drive shaft of the actuating mechanism to rotate in the reverse direction concurrently, making the at least one swinging pawl disengage from the at least one first abutting portion of the drive connector. Thereafter, the drive connector and the roller rotate freely with respect to the drive shaft under a weight of the covering material, and the covering material is extended.

In one embodiment, the unlocking mechanism further comprises a return spring disposed between the base and the moving member. When the unlocking shaft is subjected to force and thereby protrudes with respect to the fixed shaft and makes the moving member move in the first direction through the unlocking cord, the return spring undergoes elastic deformation. Thereafter, when the unlocking shaft stops being subjected to force, the return spring applies a restoring elastic force to the moving member so that the moving member is reset. While the moving member is reset, the pushing portion of the moving member skids over the tops of the plural teeth formed on the outer periphery of the driven member, and the moving member does not drive the driven member to rotate.

In one embodiment, the moving member further comprises a main body and a pushing element. The main body has a recess and a blocking edge. The pushing element has a fixed end and an engaging end opposite thereto, in which the fixed end is disposed within the recess of the main body, and the engaging end can swing in a deflecting direction with respect to the fixed end while being subjected to force. However, the engaging end is limited by the blocking edge to swing in the opposite direction to the deflecting direction while being subjected to force in a still state. Preferably, the pushing portion of the moving member is located on the engaging end of the pushing element.

In another embodiment, the pushing portion of the moving member is a rack structure with plural right-angle teeth.

In one embodiment, the actuating mechanism further comprises a covering sleeve. The covering sleeve is sleeved on the drive shaft and comprises an axial groove and at least one through groove. The drive shaft has a positioning rib embedded into the axial groove. According to different rotation directions of the drive shaft, the positioning rib abuts against one of two side walls of the axial groove and drives the covering sleeve to rotate. While the drive shaft is driven by the driven member to rotate in the reverse direction, the rotation amount of the swinging pawl is greater than the rotation amount of the covering sleeve, so that the swinging pawl swings to a recessed position where the swinging pawl does not protrude from the through groove and thereby disengages from the first abutting portion of the drive connector. Therefore, the roller can rotate with respect to the covering sleeve of the actuating mechanism for extending the covering material.

In one embodiment, the actuating mechanism further comprises a braking spring, and the base comprises a tubular shell structure. One end of the tubular shell structure is provided with a barrier. The braking spring is sleeved on the covering sleeve and has an end abutting against the barrier of the tubular shell structure. The other end of the braking spring extends into the axial groove and is hooked on the positioning rib of the drive shaft. When the swinging pawl has engaged with the first abutting portion of the drive connector, and the drive connector and the roller tend to rotate in the reverse direction under the weight of the covering material, the braking spring provides a resistance force to the roller.

In one embodiment, the rewinding unit further comprises a spring-storage wheel and a coil spring. The spring-storage wheel is rotatably sleeved on a spring-storage pillar of the base and operatively connected with the annular cord wheel, so that the spring-storage wheel can rotate with the annular cord wheel concurrently. One end of the coil spring is fixed on the spring-storage pillar of the base and the other end is fixed on the spring-storage wheel. The coil spring is wound around the spring-storage pillar. While the spring-storage wheel rotates, the coil spring is contracted or loosened correspondingly to different rotation directions of the spring-storage wheel. When the lift operating member is subjected to force and protrudes with respect to the unlocking shaft and thereby drives the annular cord wheel to rotate in the forward direction, the annular cord wheel drives the spring-storage wheel to rotate in an energy-storage direction, and the coil spring is thereby gradually contracted. Thereafter, once the lift cord stops being subjected to force, the coil spring provides a rewinding elastic force to the spring-storage wheel, such that the spring-storage wheel rotates in the opposite direction to the energy-storage direction and drives the annular cord wheel to rotate in the reverse direction, and the coil spring wound around the spring-storage pillar is thereby gradually loosened.

In one embodiment, the driven member further comprises a main portion and plural elastic supporting pieces. Each of the elastic arms of the driven member can swing with respect to the main portion. The elastic supporting pieces are disposed to correspond to the elastic arms in location, respectively, for ensuring that the elastic arms remain in a protruded state towards the second abutting portions. As so, the elastic arms can certainly engage with the second abutting portions while the annular cord wheel rotates in the forward direction. Each of the elastic supporting pieces has a first end integrally connected to the corresponding elastic arm and a second end abutting against the main portion. Alternatively, each of the elastic supporting pieces has a first end integrally connected to the main portion and a second end abutting against the corresponding elastic arm.

Regarding the present disclosure, the pull-rod mechanism and the window covering to which the pull-rod mechanism is applied have at least the following advantages:

(1) The pull-rod mechanism of the present disclosure has a more compact volume and appearance, thereby reducing constraints on the overall design of the window covering to which the pull-rod mechanism is applied.

(2) The actuating mechanism of the pull-rod mechanism of the present disclosure includes the swinging pawl that engages with the first abutting portion of the drive connector in response to the lift operating member being subjected to force and protruding with respect to the unlocking shaft. Once the lift operating member stops being subjected to force, the engagement between the swinging pawl of the actuating mechanism and the drive connector enables the roller of the window covering to resist a downward force from the weight of the covering material and stay still. Compared to the prior art, which merely uses a stop spring to tighten around a rotary sleeve for locking the rotary sleeve and preventing rotation of the rotary sleeve under the weight of the slats, the pull-rod mechanism of the present disclosure can be applied to the window covering with heavier covering materials, thereby reducing limitation in selecting material type and width dimension of the covering materials.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

The present disclosure will be understood by referring to the following detailed description of some illustrative embodiments in conjunction with the accompanying drawings, in which.

DETAILED DESCRIPTION

Figure 1:
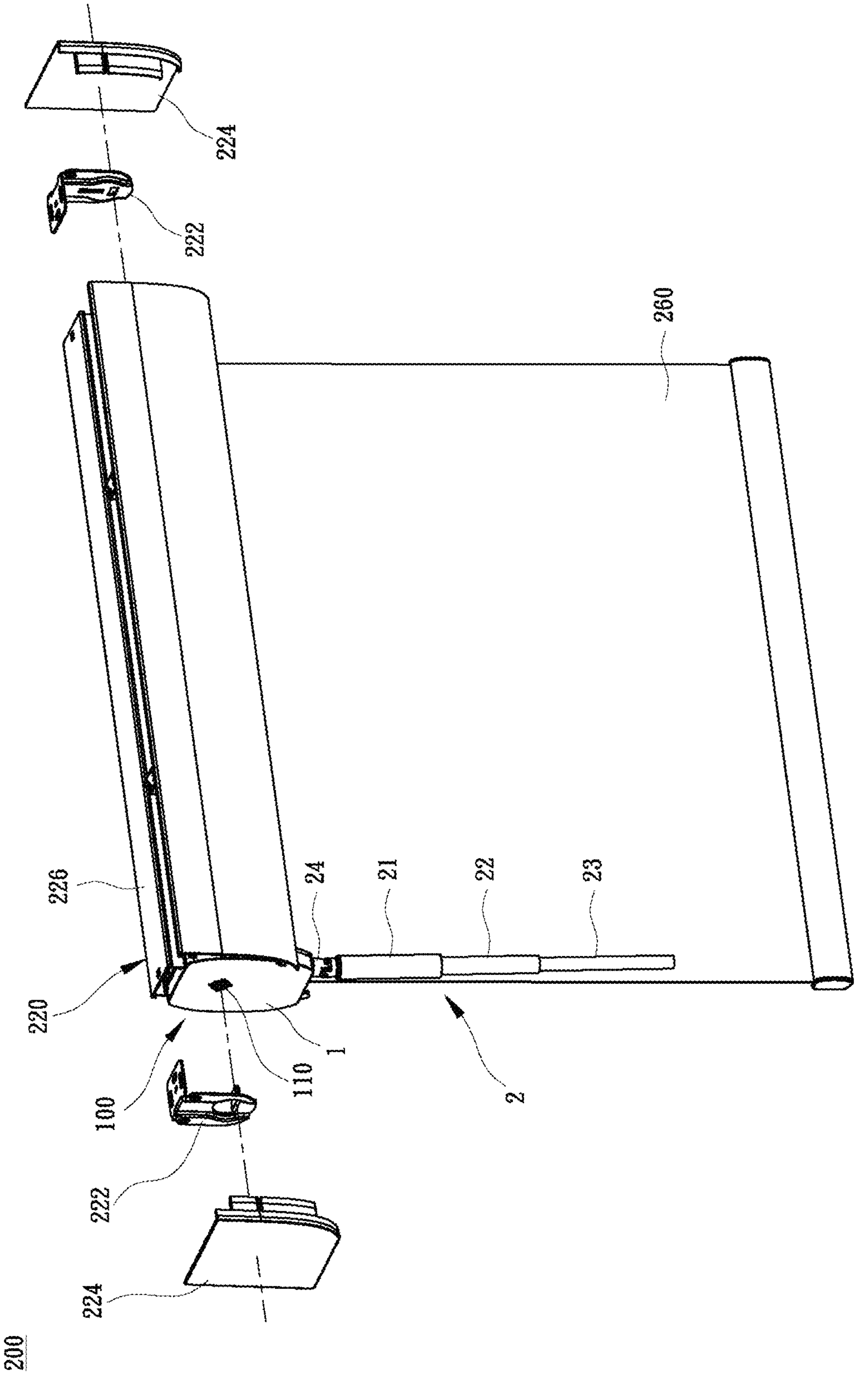
FIG. 1 is a partial exploded perspective view of one embodiment of the pull-rod mechanism and the window covering to which the pull-rod mechanism is applied, according to the present disclosure.

In the following paragraphs and the accompanying drawings, the features and the implementations of several embodiments of the present disclosure are described in more detail along with the accompanying drawings. The features and the implementations described in the following paragraphs can be adopted solely or in combination with each other. In addition, the embodiments can be modified in various forms, as disclosed in the following paragraphs, and should not be limited to the embodiments described in the following paragraphs. Unless specified otherwise, the same reference characters refer to the same components.

The technical features provided in the present disclosure are not limited to the specific structures, uses, and applications described in the embodiments. The language used in the descriptions is illustrative and descriptive language which can be understood by the person of ordinary skill in the art. The terms regarding directions mentioned in the specification, including “front”, “rear”, “up”, “down”, “left”, “right”, “top”, “bottom”, “inside”, and “outside”, are illustrative and descriptive terms based on common usage scenarios, and manifests no intent to limit the scope of claims.

Furthermore, the definite and indefinite articles “a” and “the” and the numerical term “one” used in the specification referring to components of singular form do not exclude the concept of plural form. Equivalences known by one having ordinary skill in the art should be also included. All conjunctions used in similar situations should be interpreted in the broadest ways. The specific shapes, structural features, and technical terms described in the descriptions should also be interpreted to include equivalent structures and techniques which could achieve the same functionality.

Figure 2:
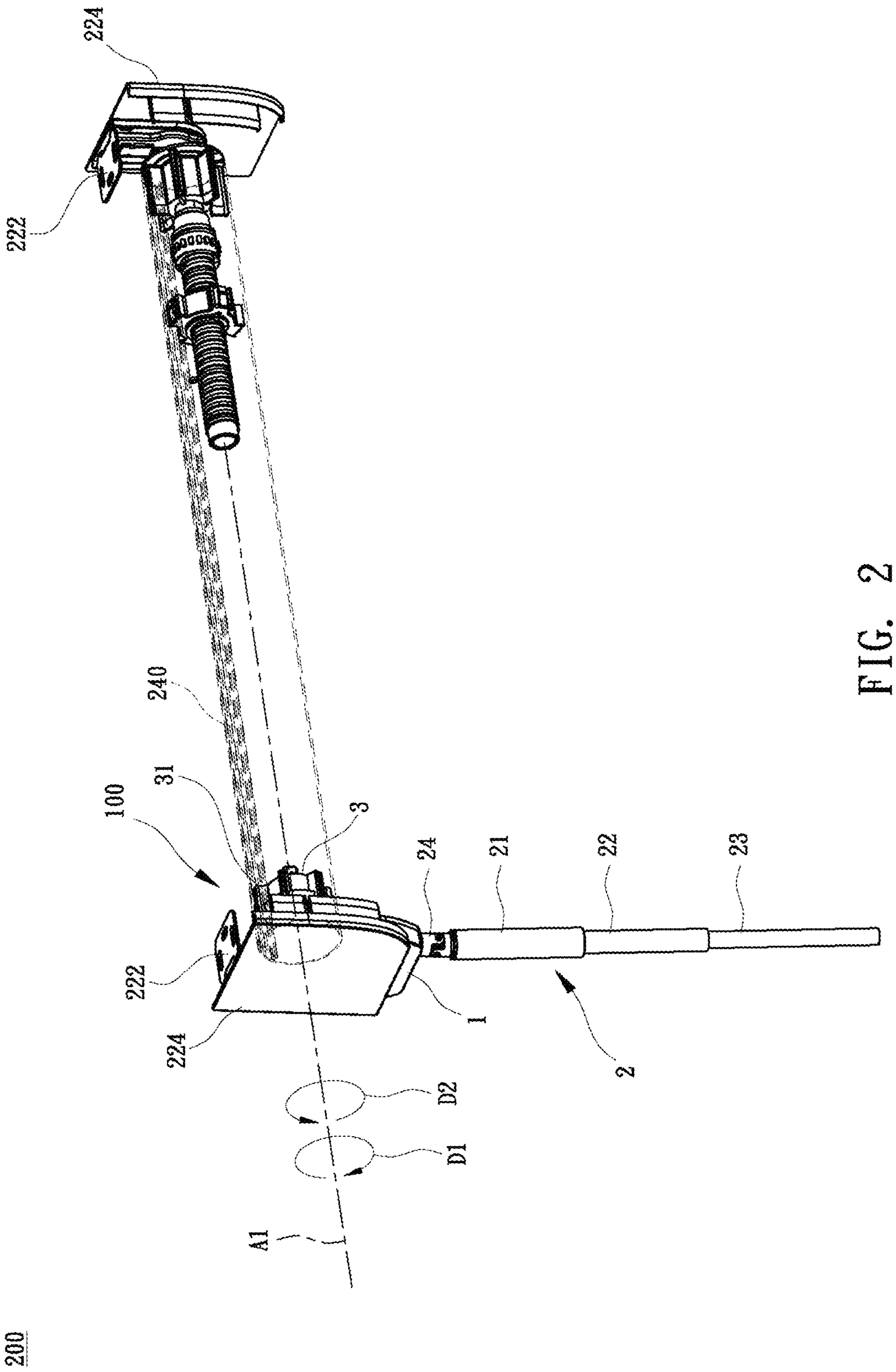
FIG. 2 is a partial see-through view of the window covering in FIG. 1, omitting the covering material and part of the headrail.

Please refer to FIG. 1 and FIG. 2. In the first embodiment of the present disclosure, the pull-rod mechanism 100 is applied to a window covering 200. The window covering 200 comprises a headrail 220, a roller 240, and a covering material 260. The headrail 220 is generally a cuboid and accommodates the roller 240. The roller 240 extends along an axis A1 and is rotatable around the axis A1 in a forward direction D1 and a reverse direction D2 opposite thereto. The pull-rod mechanism 100 is disposed on one end of the roller 240. The headrail 220 comprises two fixing brackets 222, two side covers 224, and a plate 226. Each of the two fixing brackets 222 is generally L-shaped, having its shorter side facing up for being fixed on the plate 226 and its longer side vertical to a horizontal surface of the architecture and fixedly connected to the pull-rod mechanism 100 and the roller 240. More specifically, the shorter sides of the two fixing brackets 222 are embedded into the two opposite ends of the plate 226, respectively. The longer side of one of the two fixing brackets 222 is provided with a latch extending into and engaged with a fixing groove 110 formed on a base 1 of the pull-rod mechanism 100, and the longer side of the other one of the two fixing brackets 222 is directly engaged with the end of the roller 240 other than the end where the pull-rod mechanism 100 is disposed. The plate 226 is fixed on the horizontal surface of the architecture, and it supports and fixes the pull-rod mechanism 100 and the roller 240 in place. The two side covers 224 cover the two fixing brackets 222 respectively for enhancing the overall decorative appearance of the headrail 220.

In the following context, when referring to an element "rotating forwardly", it is directed to the element rotating around the axis A1 in the forward direction D1. When referring to an element "rotating reversely", it is directed to the element rotating around the axis A1 in the reverse direction D2. Such a definition will apply throughout the following context and will not be redundantly mentioned again.

In the present embodiment, the roller 240 is an aluminum extruded pipe, and an inner circumferential surface of it is provided with a hollow protrusion extending axially, which forms a non-circular inner circumferential edge of the roller 240. The covering material 260 has an end fixed on the roller 240. When the roller 240 rotates around the axis A1, the covering material 260 is wound onto the roller 240 or unwound from the roller 240, thereby implementing retraction or extension of the window covering 200.

Figure 3:
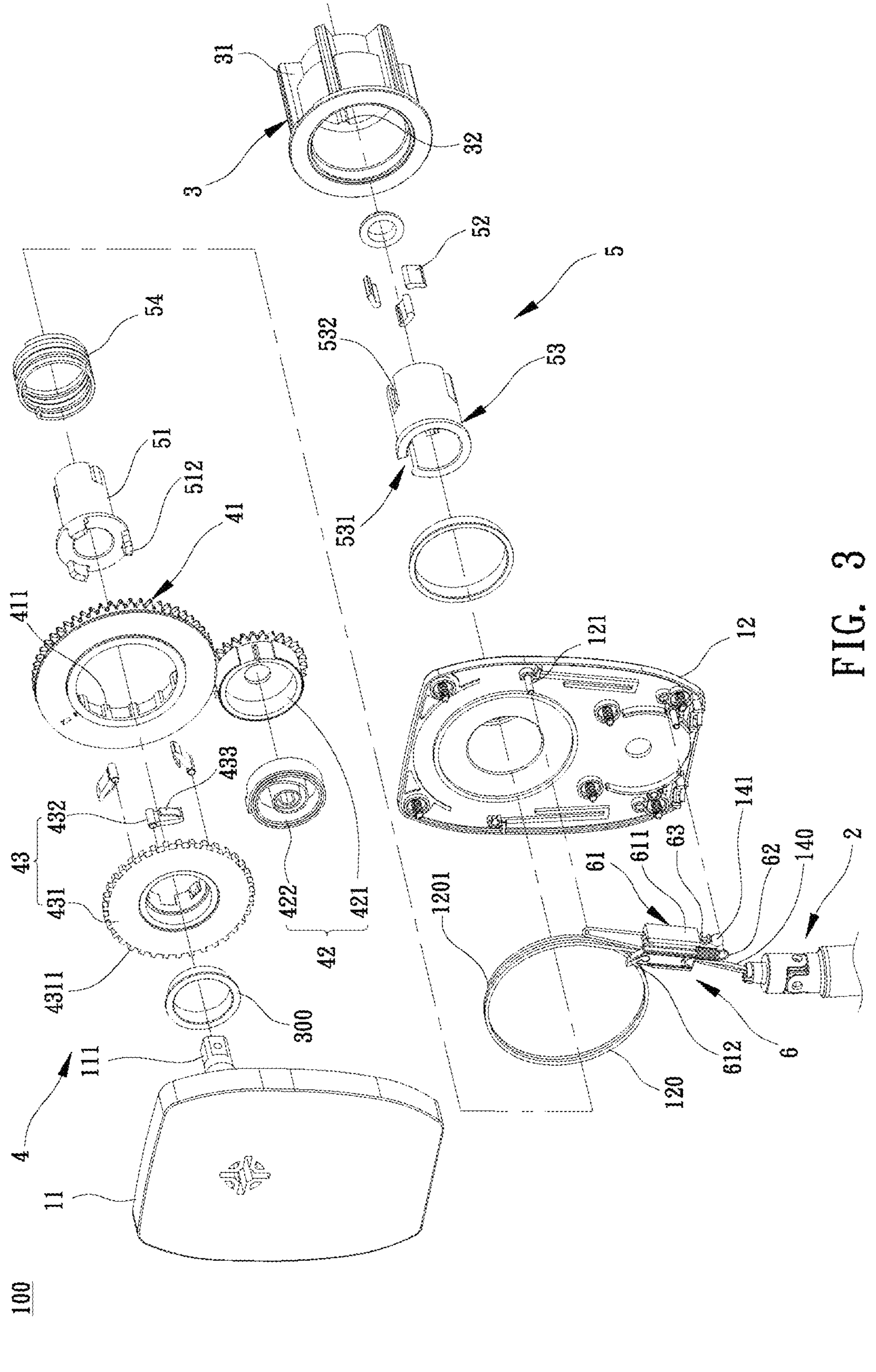
FIG. 3 is an exploded perspective view of the pull-rod mechanism in FIG. 1.
Figure 4:
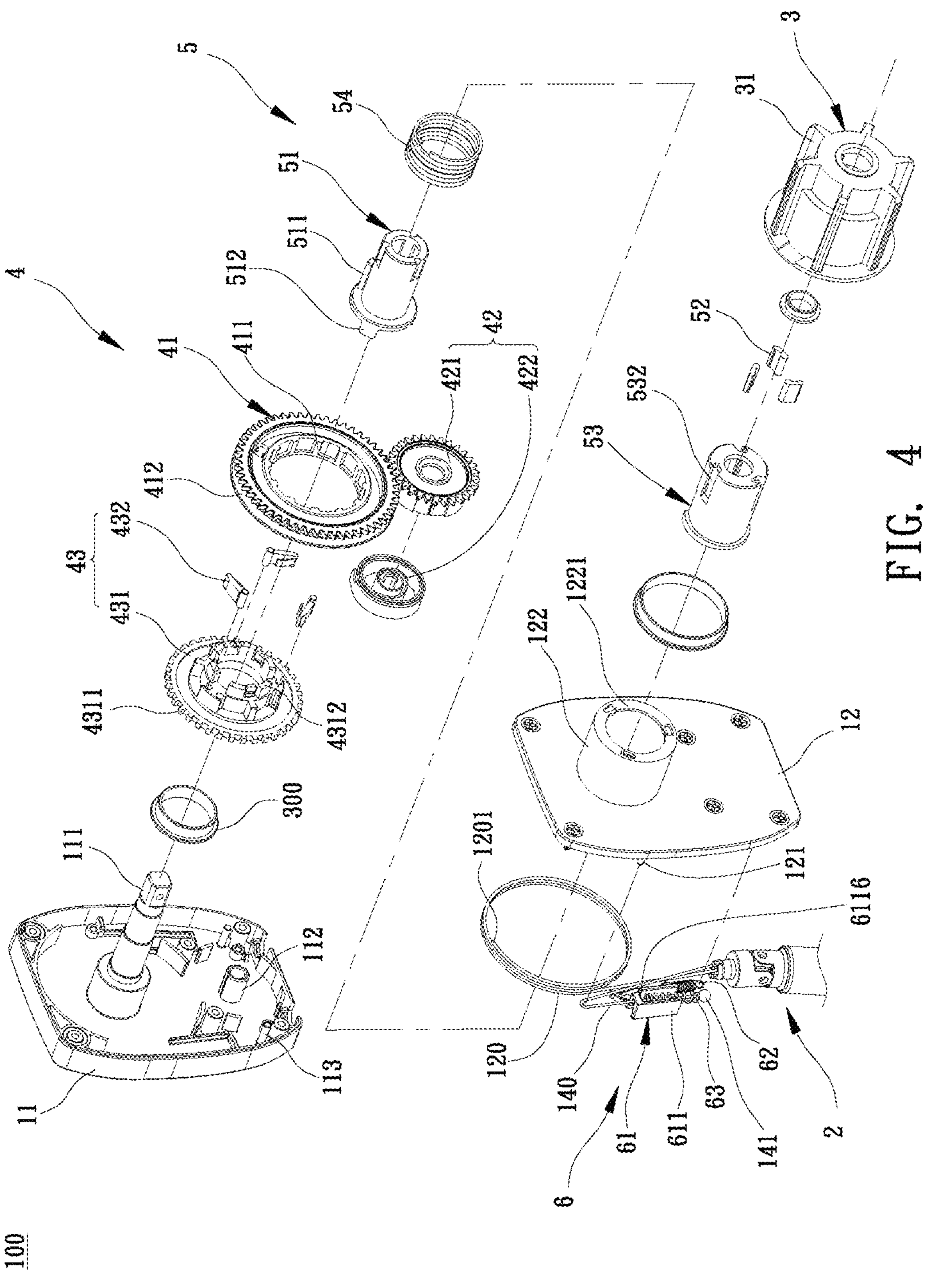
FIG. 4 is another exploded perspective view of the pull-rod mechanism in FIG. 1 from the other view angle.
Figure 5:
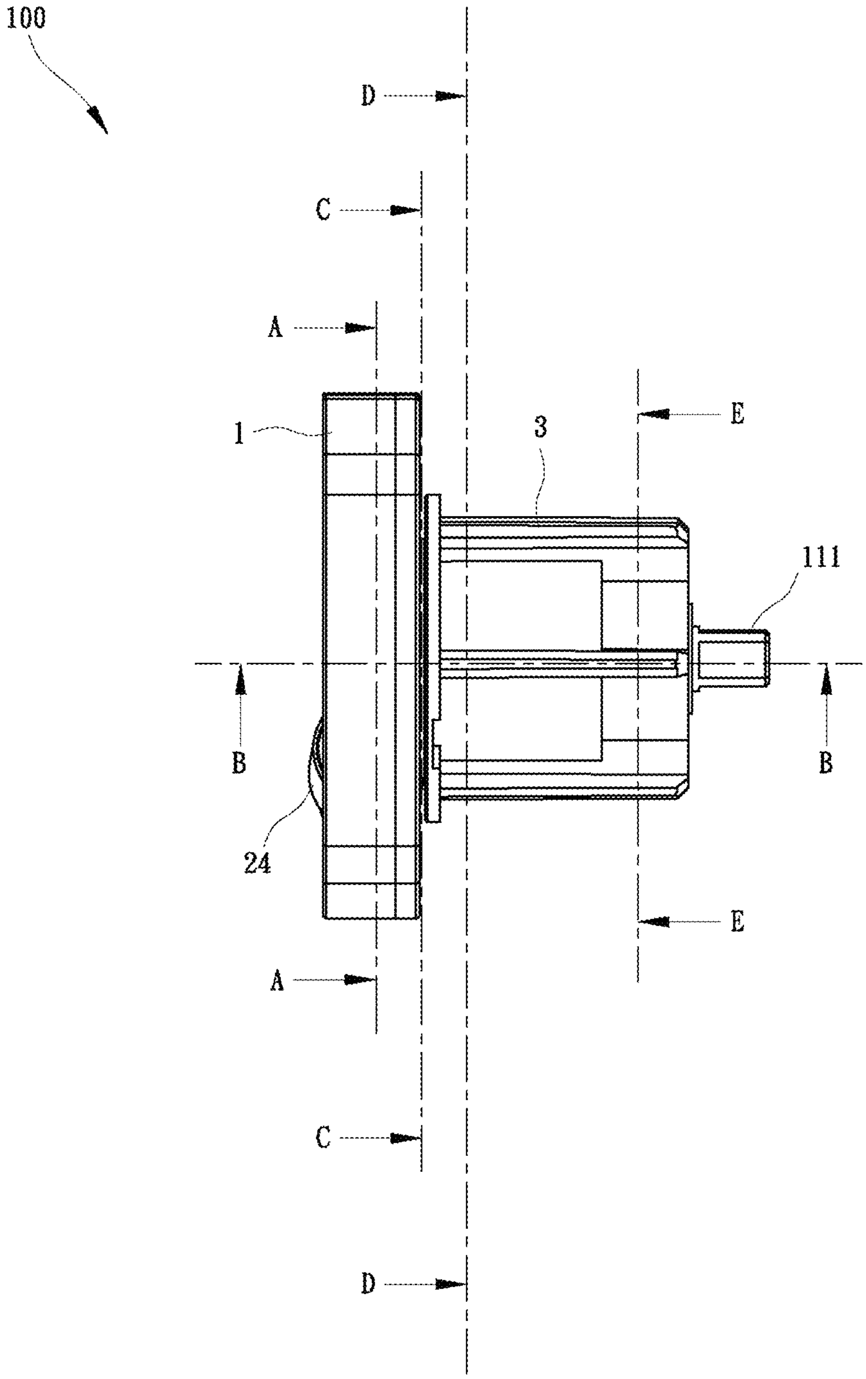
FIG. 5 is a top view of the pull-rod mechanism in FIG. 1.

Please refer to FIGS. 2-4. The pull-rod mechanism 100 comprises the base 1, a pull rod 2, a drive connector 3, a lift mechanism 4, an actuating mechanism 5, and an unlocking mechanism 6. The base 1 is composed of a first shell 11 and a second shell 12, while they are connected in an opposing manner. The first shell 11 has a support shaft 111 extending along the axis A1. A surface on the second shell 12 facing the first shell 11 is provided with a post 121, while another surface on the second shell 12 facing away from the first shell 11 is provided with a tubular shell structure 122. The tubular shell structure 122 extends in a direction away from the first shell 11, with its distal end provided with a barrier 1221. As the first shell 11 and the second shell 12 are connected face-to face, there is an accommodating space formed between the first shell 11 and the second shell 12, and the lift mechanism 4, the actuating mechanism 5, and the unlocking mechanism 6 are received in the accommodating space.

Please refer to FIGS. 1, 2, 5 and 6. The pull rod 2 is disposed below the base 1, comprising a fixed shaft 21, an unlocking shaft 22, a lift operating member 23, and a universal joint 24. The fixed shaft 21 is cylindrical and hollow but not limited thereto. The top end of the fixed shaft 21 is connected to the base 1 through the universal joint 24, such that the fixed shaft 21 can swing or rotate with respect to the base 1. The unlocking shaft 22 is cylindrical and hollow but not limited thereto. The unlocking shaft 22 penetrates into the fixed shaft 21 with at least part of the unlocking shaft 22 protrudes from the bottom of the fixed shaft 21. Meanwhile, the unlocking shaft 22 is retractable with respect to the fixed shaft 21. The lift operating member 23 has a tube shape but not limited thereto. The lift operating member 23 penetrates into the unlocking shaft 22, while at least part of the lift operating member 23 protrudes from the bottom of the unlocking shaft 22 and the lift operating member 22 is retractable with respect to the unlocking shaft 22. In the present embodiment, the fixed shaft 21, the unlocking shaft 22, and the lift operating member 23 are nested from the outermost to the innermost sequentially. In some other embodiments, the nesting manner may be varied, but at least part of the unlocking shaft 22 and part of the lift operating member 23 are accessible from the exterior for handling by the user. Additionally, in some other embodiments, the lift operating member can have another more ergonomically designed shape as long as the lift operating member is connected to the unlocking shaft in a retractable manner.

Please refer to FIGS. 2-4. The drive connector 3 is generally cylindrical, with its outer peripheral surface formed with plural ribs 31. As shown in FIG. 2, the ribs 31 of the drive connector 3 are engaged with the inner circumferential edge of the roller 240. Thereby, the drive connector 3 is fixedly connected to an end of the roller 240. With such a configuration, upon the rotation of the drive connector 3, the roller 240 is driven to rotate along with the drive connector 3. As shown in FIG. 3, an interior wall of the drive connector 3 is further provided with plural first abutting portions 32 (merely one of the first abutting portions 32 is shown) protruding inwardly. Please refer to FIG. 7 together. In the present embodiment, when the first shell 11 and the second shell 12 are assembled, the support shaft 111 of the first shell 11 penetrates through the tubular shell structure 122 and protrudes from the barrier 1221. The drive connector 3, which has a cylinder shape, is sleeved over the tubular shell structure 122, while the end of support shaft 111 passing out from the barrier 1221 of the tubular shell structure 122 further protrudes from the drive connector 3 to the exterior. Preferably, a washer 300, which is made of a wear-resistant material, is disposed between the drive connector 3 and the tubular shell structure 122.

In the present embodiment, the window covering 200 is a roller blind. However, the pull-rod mechanism of the present disclosure can be applied to other types of window coverings, such as Venetian blinds, Roman blinds, cellular shades . . . etc. In another embodiment of the present disclosure, the pull-rod mechanism is applied to a Venetian blind, in which the roller is used for winding up or unwinding several lift cords connected to a lower end of the covering material in order to retract or extend the covering material with respect to the roller. In further another embodiment of the present disclosure, the pull-rod mechanism is applied to a Venetian blind, in which the roller is a solid shaft cooperating with one or more cord-retracting reels to retract or release several lift cords for implementing retraction and extension of the Venetian blind. In that case, the drive connector has a non-circular hole (not shown in the drawings), and the solid shaft has a non-circular cross section. The solid shaft is inserted into and engaged with the non-circular hole of the drive connector so that the solid shaft is restricted from rotating with respect to the drive connector. Moreover, a locking pin can be penetrated through an overlapped section of the solid shaft and the drive connector for restricting the solid shaft from axially moving with respect to the drive connector. Thereby, the drive connector is fixedly connected to one end of the solid shaft. When the drive connector rotates, the solid shaft is driven to rotate with the drive connector.

Please refer to FIGS. 3-7 together. The lift mechanism 4 is disposed within the accommodating space in the base 1. The lift mechanism 4 comprises an annular cord wheel 41, a rewinding unit 42, and a driven member 43. The annular cord wheel 41 is rotatable around the axis A1. An inside circumferential surface of the annular cord wheel 41 is provided with plural second abutting portions 411 protruding inwardly. Meanwhile, as shown in FIG. 4, an outer circumferential curved surface of the annular cord wheel 41 is formed with an annular groove 412 concaved radially, and the outer rim of the annular cord wheel 41 is toothed. The lift mechanism 4 is operatively connected with the lift operating member 23 of the pull rod 2 through a lift cord 120. More specifically, an end 1201 of the lift cord 120 is fixedly connected to the annular cord wheel 41, and at least part of the lift cord 120 is wound in the annular groove 412. The other end of the lift cord 120 opposing to the end 1201 extends from the accommodating space of the base 1 into the pull rod 2 and is fixedly connected to a first end plug 231 of the lift operating member 23. The lift cord 120 remains in a taut state. Therefore, when the lift operating member 23 is subjected to force and protrudes with respect to the unlocking shaft 22, the lift cord 120 moves together with the lift operating member 23 and thereby drives the annular cord wheel 41 to rotate forwardly.

Figure 7:
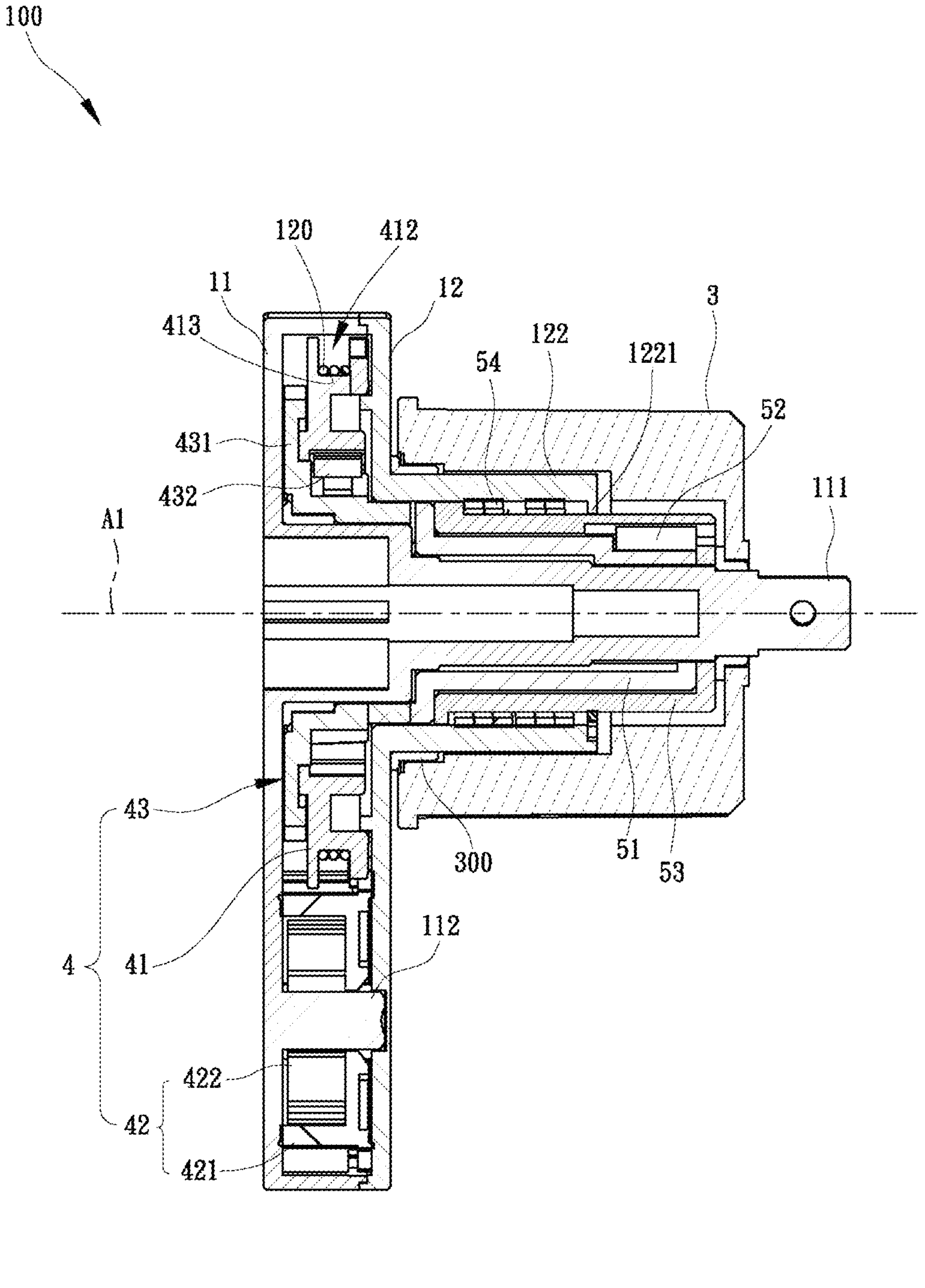
FIG. 7 is a partial cross-sectional view along the line B-B in FIG. 5.
Figure 8:
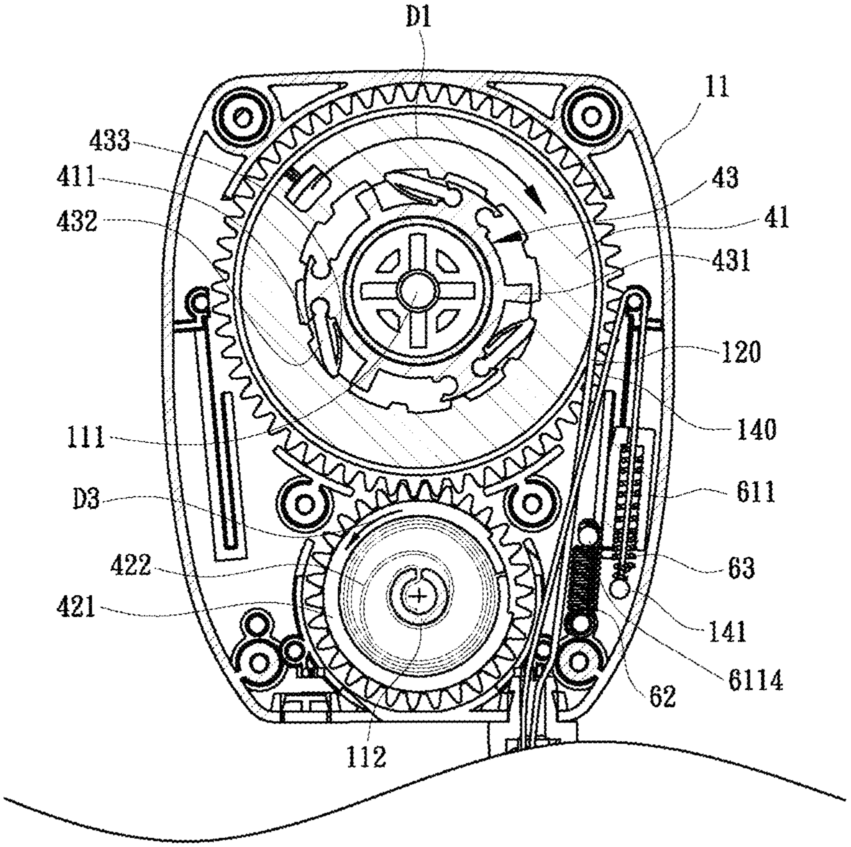
FIG. 8 is another partial cross-sectional view along the line A-A in FIG. 5.

Please refer to FIGS. 3, 4, 7, and 8 together. The unwinding unit 42 is operatively connected to the annular cord wheel 41, serving to store energy upon the rotation of the annular cord wheel 41 as the annular cord wheel 41 is subjected to a force, and to release that energy and apply a rewinding elastic force to the annular cord wheel 41 once the annular cord wheel 41 stops being subjected to that force for resetting the annular cord wheel 41. The rewinding unit 42 comprises a spring-storage wheel 421 and a coil spring 422. The spring-storage wheel 421 is composed of a drum-shaped body and a toothed plate, in which the toothed plate is meshed with the outer rim of the annular cord wheel 41 that is toothed. Moreover, the toothed plate has an axial hole, through which the spring-storage wheel 421 is rotatably sleeved on a spring-storage pillar 112 provided on the first shell 11 of the base 1. The coil spring 422 is accommodated within the drum-shaped body of the spring-storage wheel 421. Referring to FIG. 8, one end of the coil spring 422 is fixedly connected to the drum-shaped body of the spring-storage wheel 421, while the other end of the coil spring 422 is fixed on the spring-storage pillar 112 of the first shell 11. The coil spring 422 is generally wound around the spring-storage wheel 421. According to different rotation directions of the spring-storage wheel 421, the coil spring 422 is contracted or loosened, thereby storing or releasing energy for providing the rewinding elastic force. The driven member 43 and the annular cord wheel 41 are coaxially disposed within the base 1, and the outer periphery of the driven member 43 is formed with plural teeth 4311. Moreover, the driven member 43 comprises a main portion 431 and plural elastic arms 432. As shown in FIG. 8, the elastic arms 432 are disposed on the main portion 431 to correspond to the second abutting portions 411 in location respectively, in which the second abutting portions 411 are formed on the inside circumferential surface of the annular cord wheel 41. Furthermore, the elastic arms 432 are each elastically swingable with respect to the main portion 431.

Figure 6:
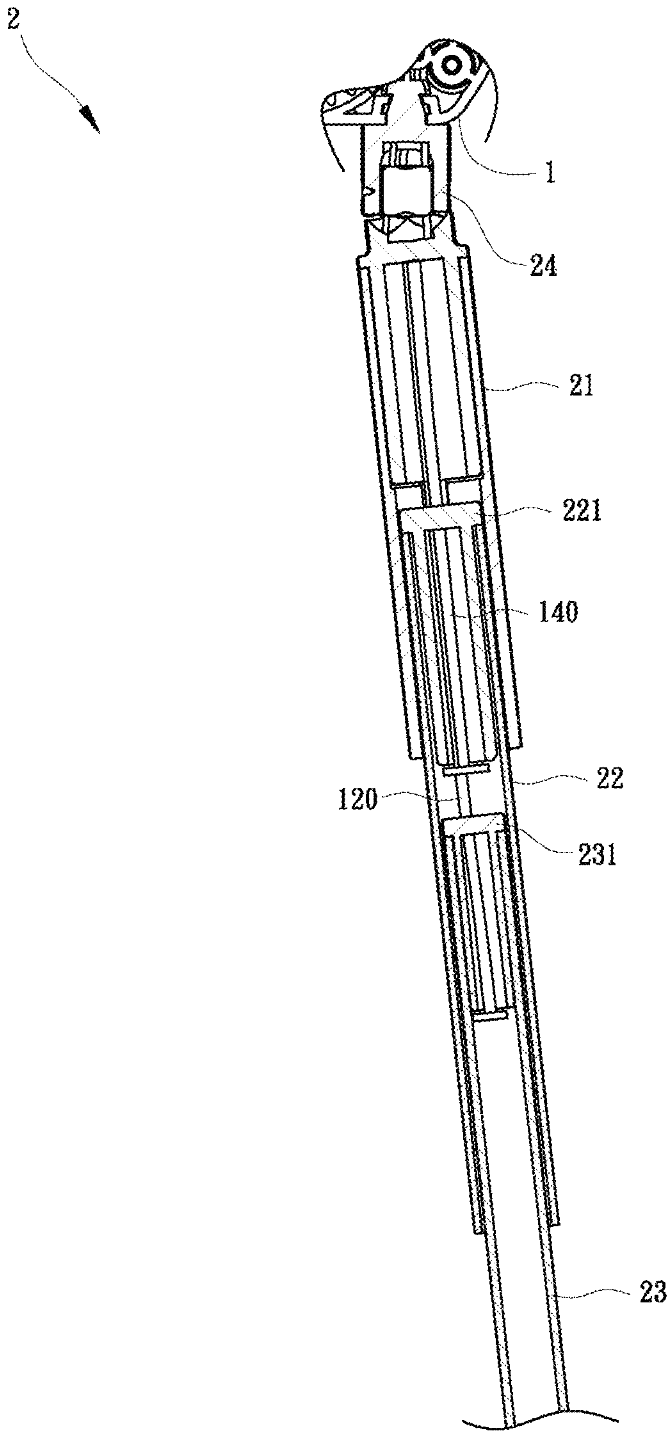
FIG. 6 is a partial cross-sectional view along the line A-A in FIG. 5.
Figure 9:
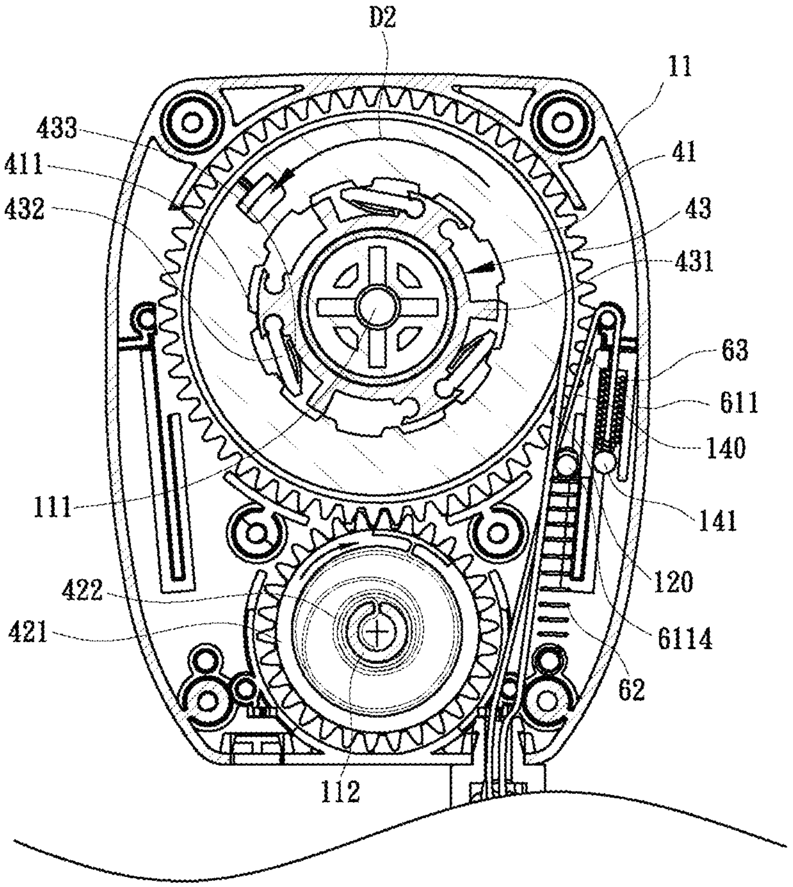
FIG. 9 is schematical view showing actions of the lift mechanism of the pull-rod mechanism.

Referring to FIGS. 6, 8 and 9, when the lift operating member 23 is subjected to force and protrudes with respect to the unlocking shaft 22, the lift cord 120 is pulled, thereby driving the annular cord wheel 41 to rotate forwardly, and making the elastic arms 432 of the driven member 43 abut against the second abutting portions 411 on the inside circumferential surface of the annular cord wheel 41 respectively, as shown in FIG. 8. Subsequently, while the annular cord wheel 41 rotates forwardly, the driven member 43 is driven by the annular cord wheel 41 to rotate forwardly concurrently, and the spring-storage wheel 421 is continuously driven by the annular cord wheel 41 to rotate in an energy-storage direction D3, making the coil spring 422 gradually contracted and store energy. In this state, once the lift operating member 23 stops being subjected to force, the coil spring 422 releases that energy and applies the rewinding elastic force to the spring-storage wheel 421, so that the spring-storage wheel 421 is driven to rotate in the opposite direction to the energy-storage direction D3. Thereby, the annular cord wheel 41 is driven to rotate reversely to be reset to the previous position, and the coil spring 422 is gradually loosened as remaining wound around the spring-storage wheel 421. While the annular cord wheel 41 rotates reversely, the elastic arms 432 of the driven member 43 skid over the tops of the second abutting portions 411 respectively, as shown in FIG. 9, and the annular cord wheel 41 does not drive the driven member 43 to rotate together.

Please continue referring to FIG. 8 and FIG. 9. In the present embodiment, the driven member 43 further comprises plural elastic supporting pieces 433. The elastic supporting pieces 433 are disposed to correspond to the elastic arms 432 in location, respectively. Each of the elastic supporting pieces 433 has a first end integrally connected to the corresponding one of the elastic arms 432 and a second end being a free end abutting against the main portion 431. With such a configuration, while the annular cord wheel 41 rotates reversely, the elastic supporting pieces 433 ensure that each of the elastic arms 432 can be restored to and remains in a state, in which each of the elastic arms 432 protrudes towards the second abutting portions 411 after skidding over the tops of the second abutting portions 411. Therefore, the elastic arms 432 can effectively engage with the second abutting portions 411 when the annular cord wheel 41 rotates forwardly.

Figure 10:
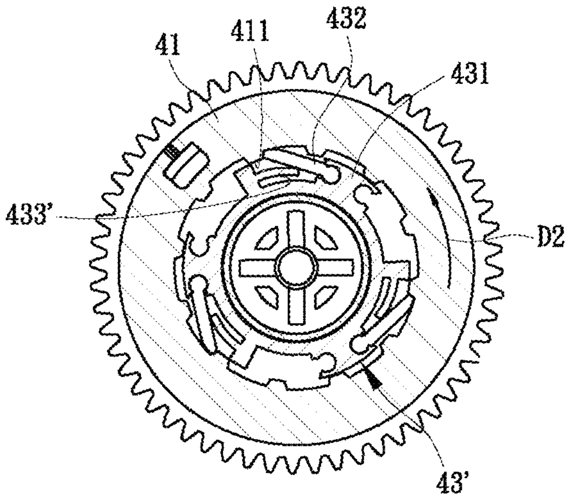
FIG. 10 is a schematical cross-sectional view of the driven member of the pull-rod mechanism, according to another embodiment of the present disclosure.

Please refer to FIG. 10. In another embodiment, each of the elastic supporting pieces 433' of the driven member 43' has a first end integrally connected to the main portion 431 and a second end being a free end abutting against the corresponding one of the elastic arms 432. With such a configuration, while the annular cord wheel 41 rotates reversely, the elastic supporting pieces 433' also ensure that each of the elastic arms 432 can be restored to and remains in the state, in which each of the elastic arms 432 protrudes towards the second abutting portions 411 after skidding over the tops of the second abutting portions 411. Therefore, the elastic arms 432 can effectively engage with the second abutting portions 411 when the annular cord wheel 41 rotates forwardly.

Figure 11:
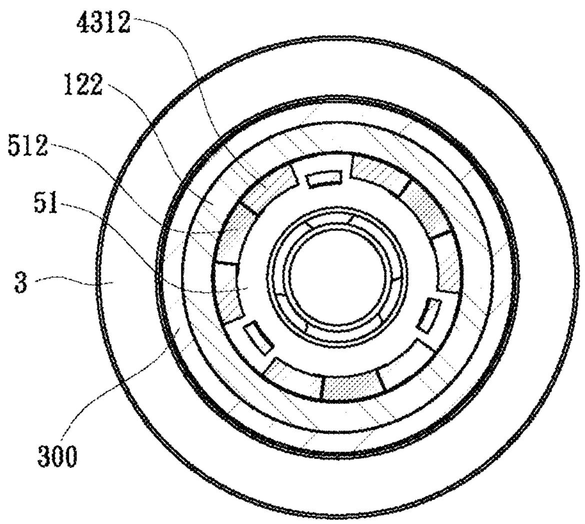
FIG. 11 is a cross-sectional view along the line C-C in FIG. 5.
Figure 12:
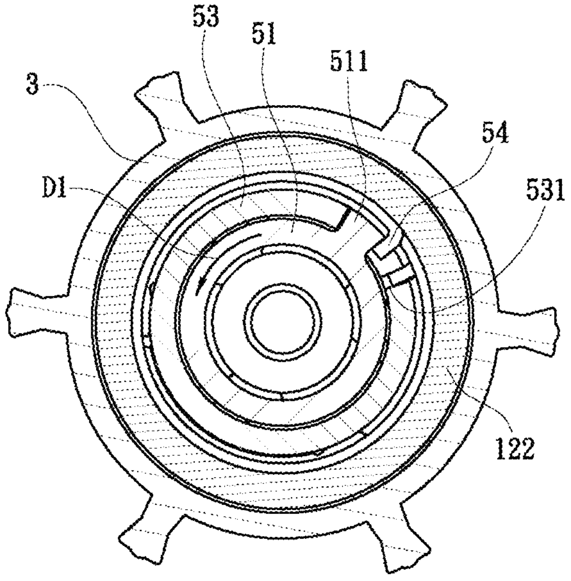
FIG. 12 is a cross-sectional view along the line D-D in FIG. 5.
Figure 13:
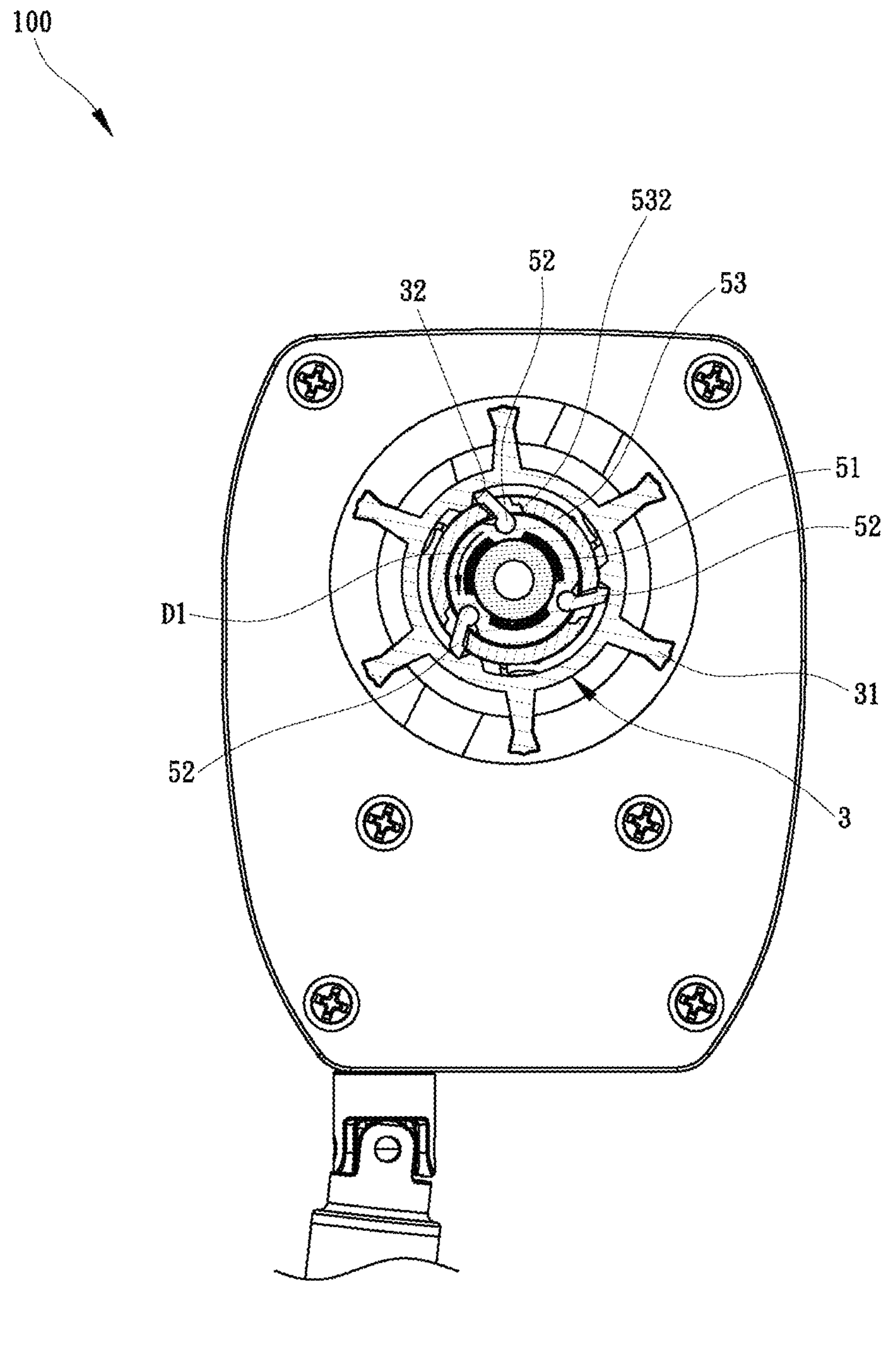
FIG. 13 is partial cross-sectional view along the line E-E in FIG. 5.

Please refer back to FIGS. 3, 4 and 7, and refer to FIGS. 11-13 together. The actuating mechanism 5 is operatively connected between the lift mechanism 4 and the drive connector 3. The actuating mechanism 5 comprises a drive shaft 51, plural swinging pawls 52, a covering sleeve 53, and a braking spring 54. As shown in FIG. 4, the drive shaft 51 has a positioning rib 511 and plural blocking protrusions 512. Meanwhile, the main portion 431 of the driven member 43 comprises plural coupling protrusions 4312 protruding towards the blocking protrusions 512 of the drive shaft 51. As shown in FIG. 7 and FIG. 11, by engaging the blocking protrusions 512 with the coupling protrusions 4312, an end of the drive shaft 51 is fixedly connected to the driven member 43, while the other end of the drive shaft 51 extends along the axis A1 into the interior of the drive connector 3. Upon the rotation of the driven member 43, the drive shaft 51 is driven by the driven member 43 to rotate concurrently in the same direction as the driven member 43. As shown in FIG. 13, the swinging pawls 52 are swingably disposed between the drive shaft 51 and the drive connector 3, while each of the swinging pawls 52 has an end pivotally engaged with the respect concave portions on the drive shaft 51. The covering sleeve 53 is sleeved on the drive shaft 51. One end of the covering sleeve 53 that is sleeved over the drive shaft 51 is provided with an axial groove 531 (see FIG. 3), while the other end of the covering sleeve 53 is formed with plural through grooves 532. As shown in FIGS. 7, 12 and 13, when the covering sleeve 53 is sleeved on the drive shaft 51, the positioning rib 511 of the drive shaft 51 is embedded into the axial groove 531. When the drive shaft 51 rotates, the positioning rib 511 abuts against one of the two side walls of the axial groove 531 according to different rotation directions of the drive shaft 51 and drives the covering sleeve 53 to rotate. Since the circumferential length of the positioning rib 511 is slightly shorter than the circumferential length of the axial groove 531, the positioning rib 511 does not completely match in size with the axial groove 531. Therefore, once the drive shaft 51 starts rotating, the drive shaft 51 undergoes a short idle rotation before abutting against one of the two side walls of the axial groove 531. According to different rotation directions of the drive shaft 51, such a short idle rotation of the drive shaft 51 makes the swinging pawls 52 protrude from the corresponding one of the through grooves 532 and abut against the first abutting portions 32 of the drive connector 3, or alternatively, recessed into the corresponding one of the through grooves 532 without contacting with the first abutting portions 32. The braking spring 54 is sleeved on the covering sleeve 53, in which one end of the braking spring 54 abuts against the barrier 1221 of the tubular shell structure 122, and the other end of the braking spring 54 extends into the axial groove 531 and is hooked on the positioning rib 511 of the drive shaft 51.

Figure 15:
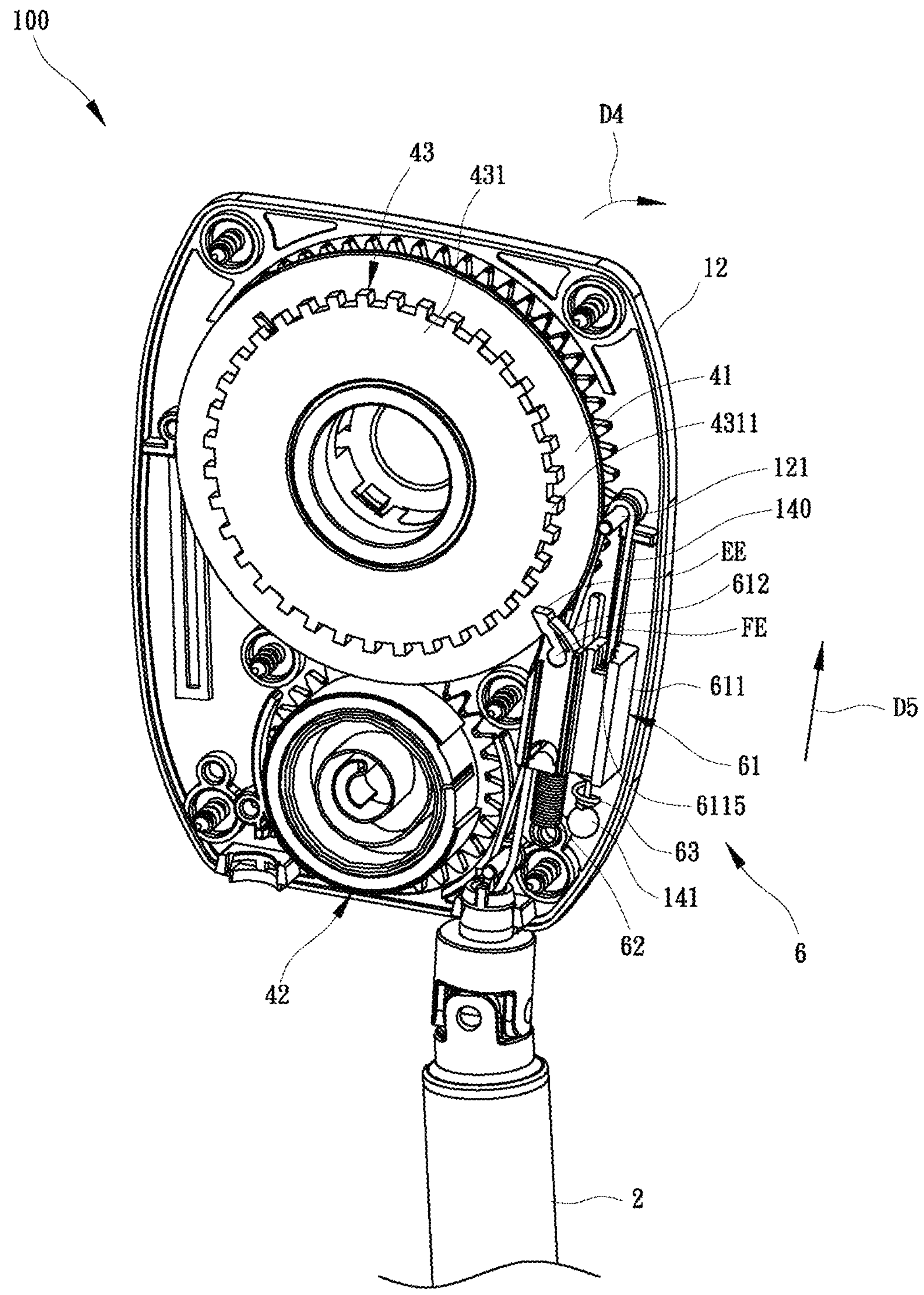
FIG. 15 is a partial enlarged view of the pull-rod mechanism in FIG. 1, omitting the first shell.
Figure 16:
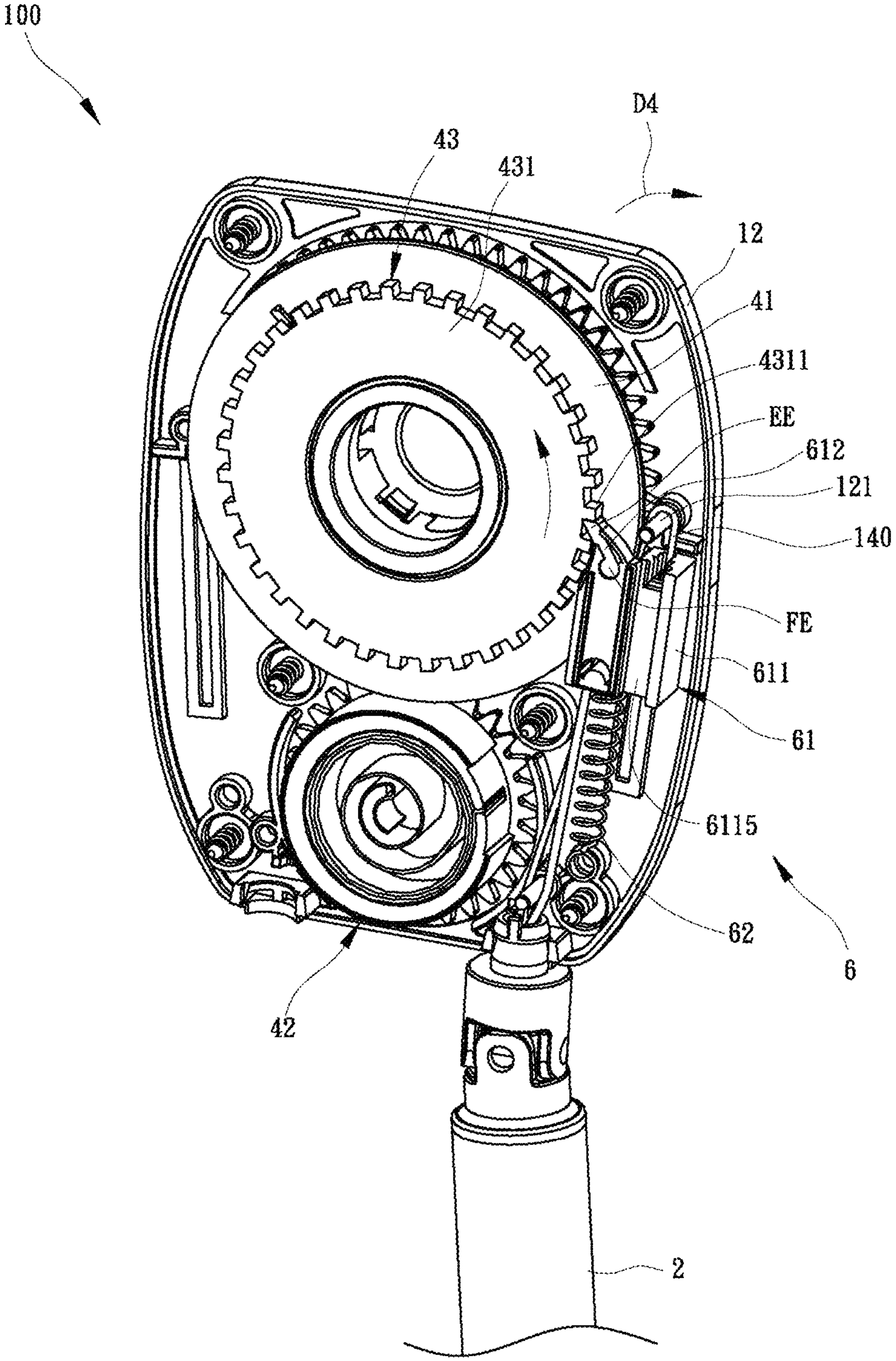
FIG. 16 is schematical view showing actions of the unlocking mechanism of the pull-rod mechanism.
Figure 17:
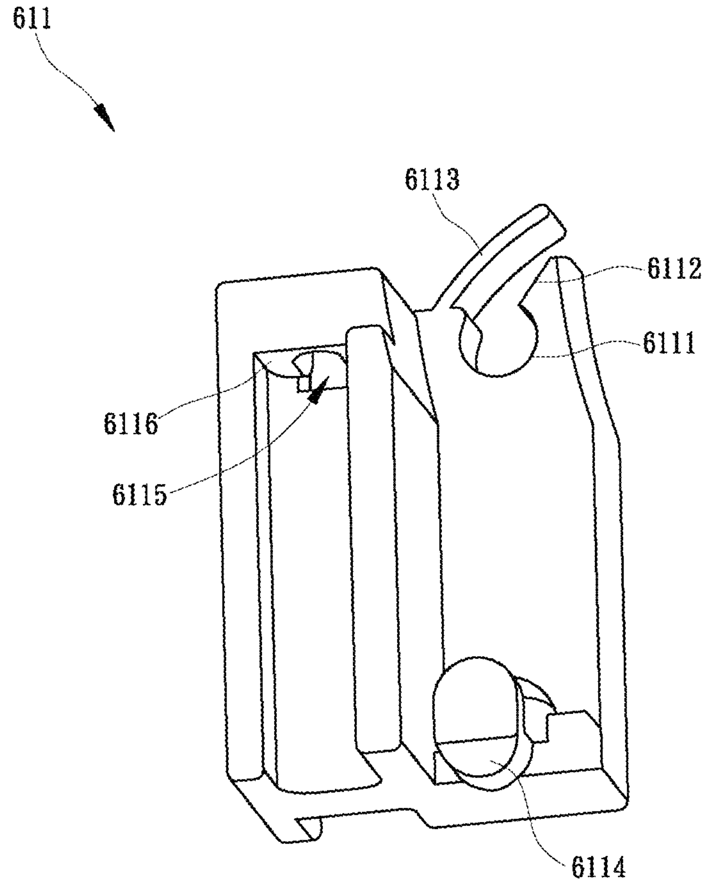
FIG. 17 is a perspective view of the main body of the moving member of the unlocking mechanism in FIG. 15.

Please refer to FIGS. 15-17 together with FIG. 6. The unlocking mechanism 6 is disposed within the base 1 and is operatively connected with the unlocking shaft 22 of the pull rod 2 through an unlocking cord 140. The unlocking mechanism 6 comprises a moving member 61, a return spring 62, and an auxiliary spring 63 (shown in FIG. 16). The moving member 61 comprises a main body 611 and a pushing element 612. As shown in FIG. 17, the main body 611 has a recess 6111, a blocking edge 6112, an elastic portion 6113, a convex fixing portion 6114, a cord hole 6115, and a second abutting surface 6116. Referring to FIGS. 15-17 together, one end of the unlocking cord 140 penetrates into the cord hole 6115 of the main body 611 and is tied into a knot 141 to be fixed. The pushing element 612 has a fixed end FE and an engaging end EE opposite thereto, in which the fixed end FE is embedded into the recess 6111 of the main body 611 such that the pushing element 612 can pivotally swing around the fixed end FE. While the pushing element 612 is not subjected to force and in a still state, it rests on the blocking edge 6112. Once the pushing element 612 is applied by a force away from the blocking edge 6112, the engaging end EE swings around the fixed end FE in a deflecting direction D4, during which the engaging end EE pushes the elastic portion 6113, causing the elastic portion 6113 to undergo elastic deformation. After the force is removed, the elastic portion 6113 applies an elastic force to the pushing element 612, so that the pushing element 612 swings back to the previous position where it rests on the blocking edge 6112.

Please refer to FIG. 6 and FIG. 15 together. One end of the unlocking cord 140 is fixed to the moving member 61. After the unlocking cord 140 extends from the aforesaid end fixed to the moving member 61 out through the cord hole 6115 of the main body 611, the unlocking cord 140 goes around the curved surface on the post 121 before downwardly extending out from the base 1 into the pull rod 2 and being connected to a second end plug 221 of the unlocking shaft 22. The unlocking cord 140 remains in a taut state. Therefore, when the unlocking shaft 22 is subjected to force and protrudes with respect to the fixed shaft 21, the unlocking cord 140 moves together with the unlocking shaft 22 and thereby drives the moving member 61 to move in a first direction D5.

Please continue referring to FIGS. 15-17, and refer to FIGS. 4, 8 and 9 together. The bottom end of the return spring 62 is fixedly fitted around a fixing post 113 of the first shell 11, while the top end of the return spring 62 is fixedly sleeved over the convex fixing portion 6114 (shown in FIG. 17). On the other hand, the auxiliary spring 63 is sleeve on the unlocking cord 140. The top end of the auxiliary spring 63 abuts against the second abutting surface 6116 (shown in FIG. 17), while the bottom end of the auxiliary spring 63 is narrowed and abuts against the knot 141 of the unlocking cord 140. When the unlocking shaft 22 protrudes with respect to the fixed shaft 21 such that the moving member 61 is driven to move in the first direction D5, a pushing portion of the moving member 61 engages with the teeth 4311 on the outer periphery of the driven member 43 and drives the driven member 43 to rotate reversely. Meanwhile, the return spring 62 is elongated during the moving of the moving member 61 to store energy. In the present embodiment, the pushing portion of the moving member 61 is located on the engaging end EE of the pushing element 612. In this state, once the unlocking shaft 22 stops being subjected to force, the return spring 62 releases that energy and applies a restoring elastic force to the moving member 61, so that the moving member 61 is driven to move in the opposite direction to the first direction D5 and is reset to the previous position. The auxiliary spring 63 prevents the moving member 61 from excessively moving in the opposite direction to the first direction D5 and is beneficial to precisely resetting the moving member 61 to the previous position. While the moving member 61 returns to the previous position, the engaging end EE of the pushing element 612 of the moving member 61 skids over the tops of the teeth 4311 on the outer periphery of the driven member 43 or does not contact with the teeth 4311 at all, so that the moving member 61 does not drive the driven member 43 to rotate then.

Figure 18:
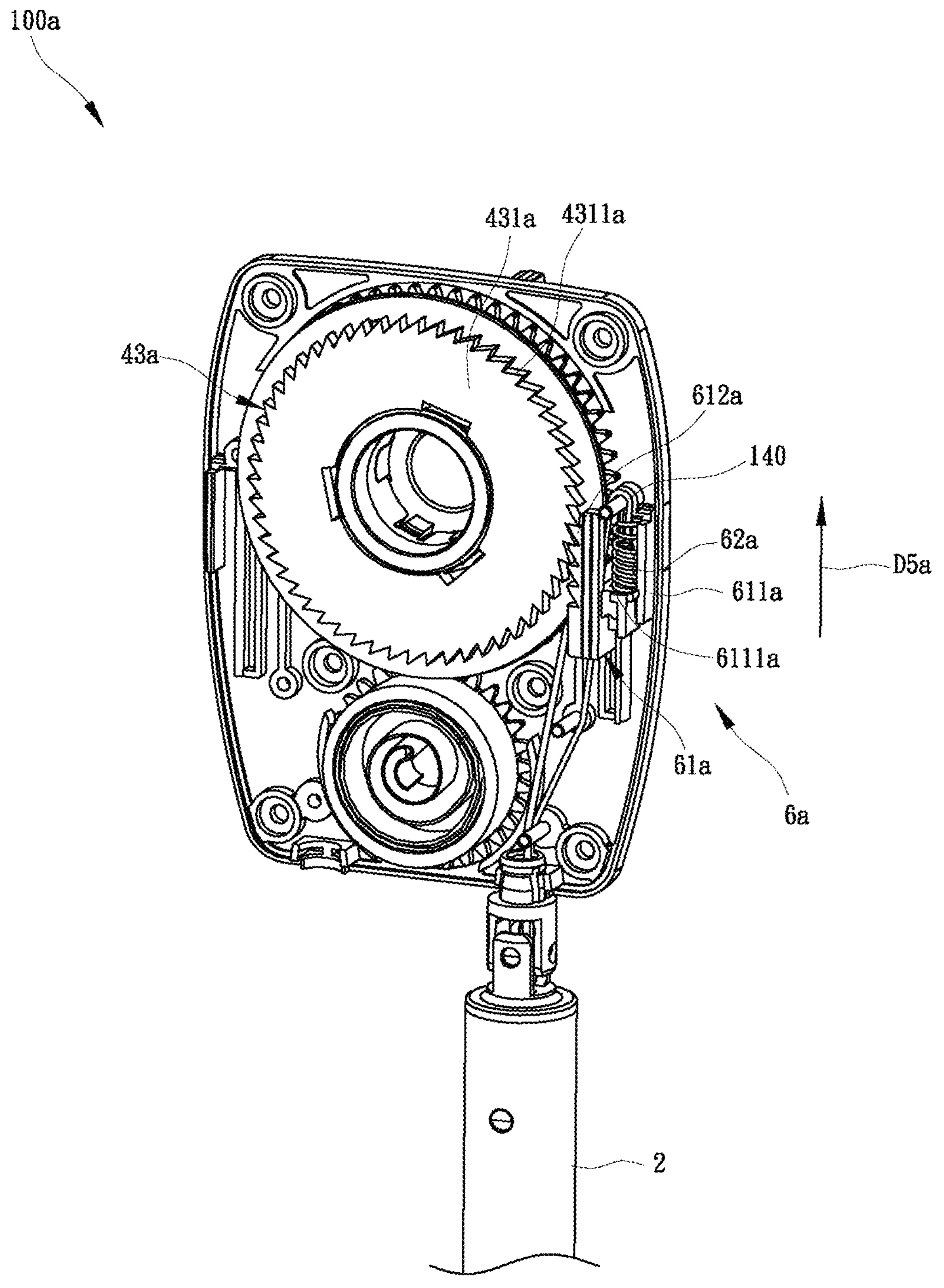
FIG. 18 is a partial enlarged view of the pull-rod mechanism according to a further embodiment of the present disclosure, omitting the first shell.

Referring to FIG. 18, in a further embodiment of the present disclosure, the outer periphery of the driven member 43*a* of the pull-rod mechanism 100*a* is formed with plural teeth 4311*a*. The teeth 4311*a* are ratchet teeth. Meanwhile, the moving member 61*a* of the unlocking mechanism 6*a* comprises a main body 611*a* and a rack structure 612*a*. One end of the unlocking cord 140 extends into the main body 611*a* and is tied into a knot to be fixed. The rack structure 612*a* has plural right-angle teeth. In the present embodiment, the rack structure 612*a* is the pushing portion of the moving member 61*a*, and the two ends of the return spring 62*a* abut against a fixing part (not shown in the drawings) on the base of the pull-rod mechanism 100*a* and a contact surface 6111*a* on the main body 611*a* of the moving member 61*a*, respectively. When the pull rod 2 of the pull-rod mechanism 100*a* is operated, making the unlocking shaft (not shown in the drawings) subjected to force and protrude with respect to the fixed shaft, the moving member 61*a* is driven by the unlocking cord 140 to move in a first direction D5*a*, such that the pushing portion of the moving member 61*a*, i.e., the rack structure 612*a*, engages with the teeth 4311*a* on the outer periphery of the driven member 43*a* and drives the driven member 43*a* to rotate reversely. Meanwhile, the return spring 62*a* is compressed and stores energy. In this state, once the unlocking shaft (not shown in the drawings) stops being subjected to force, the return spring 62*a* releases that energy and applies a restoring elastic force to the moving member 61*a*, so that the moving member 61*a* is driven to move in the opposite direction to the first direction D5*a* and is reset to the previous position. While the moving member 61*a* is reset to the previous position, the rack structure 612*a* of the moving member 61*a* skids over the tops of the teeth 4311*a* on the outer periphery of the driven member 43*a* or does not contact with the teeth 4311*a*, so that the moving member 61*a* does not drive the driven member 43*a* to rotate then.

The method of operating the window covering 200 and the related action process of the components will be described below. Please refer to FIGS. 1-7 and FIGS. 11-12 together. The user can pull down the lift operating member 23 repeatedly to retract the window covering 200. Every time when the user pulls the lift operating member 23 outwardly with respect to the unlocking shaft 22 from an initial position to an elongated position, the lift operating member 23 drives the annular cord wheel 41 to rotate forwardly through the lift cord 120, making the elastic arms 432 of the driven member 43 abut against the second abutting portions 411 on the inside circumferential surface of the annular cord wheel 41 respectively, as shown in FIG. 12. Thereby, the driven member 43 is driven to rotate forwardly with the annular cord wheel 41 concurrently, which triggers the drive shaft 51 to rotate forwardly as well, causing the swinging pawls 52 to protrude from the through grooves 532 and abut against the first abutting portions 32 of the drive connector 3. Under this circumstance, the rotation of the annular cord wheel 41 in the forward direction D1 transmits a co-directional torque to the roller 240 through the driven member 43, the drive shaft 51, and the drive connector 3 sequentially. Under the effect of the torque, the roller 240 rotates and upwardly retracts at least part of the covering material 260.

Once the user stops applying force, the rewinding unit 42 drives the annular cord wheel 41 to rotate reversely for resetting the annular cord wheel 41, and a part of the lift cord 120, which was previously released from the annular cord wheel 41, is re-wound in the annular groove 412 of the annular cord wheel 41, causing the lift operating member 23 to move with respect to the unlocking shaft 22 from the elongated position back to the initial position. In the meantime, the driven member 43 and the drive shaft 51 stop rotating.

Additionally, as shown in FIGS. 1, 2, 7 and 12, while the drive shaft 51 rotates forwardly, the end of the braking spring 54 that is hooked on the positioning rib 511 is moved, so that a diameter of the part of the braking spring 54 sleeved on the covering sleeve 53 is reduced. As a result, the braking spring 54 can rotate with the covering sleeve 53 then. The rotation of the covering sleeve 53 can also drive the drive connector 3 to rotate, which further drives the roller 240 to rotate such that at least part of the covering material 260 is retracted. Once the drive shaft 51 stops rotating as the user stops applying force, the drive connector 3 and the roller 240 rotate in the reverse direction D2 to a small degree under the weight of the covering material 260, which presses and pushes the end of the braking spring 54 that is hooked on the positioning rib 511 such that the diameter of the part of the braking spring 54 sleeved on the covering sleeve 53 is expanded. As a result, the friction between the braking spring 54 and the tubular shell structure 122 increases, providing a resistance force to the roller 240 through the engagement between the swinging pawls 52 and the first abutting portions 32 which helps the roller 240 to stay still.

By repeating the above-mentioned operation, the user intermittently provides the torque in the forward direction D1 to the roller 240, upwardly rolling up at least part of the covering material 260 until the bottom edge of the covering material 260 reaches an expected height, or until the covering material 260 is fully rolled up for completely retracting and opening the window covering 200.

Figure 14:
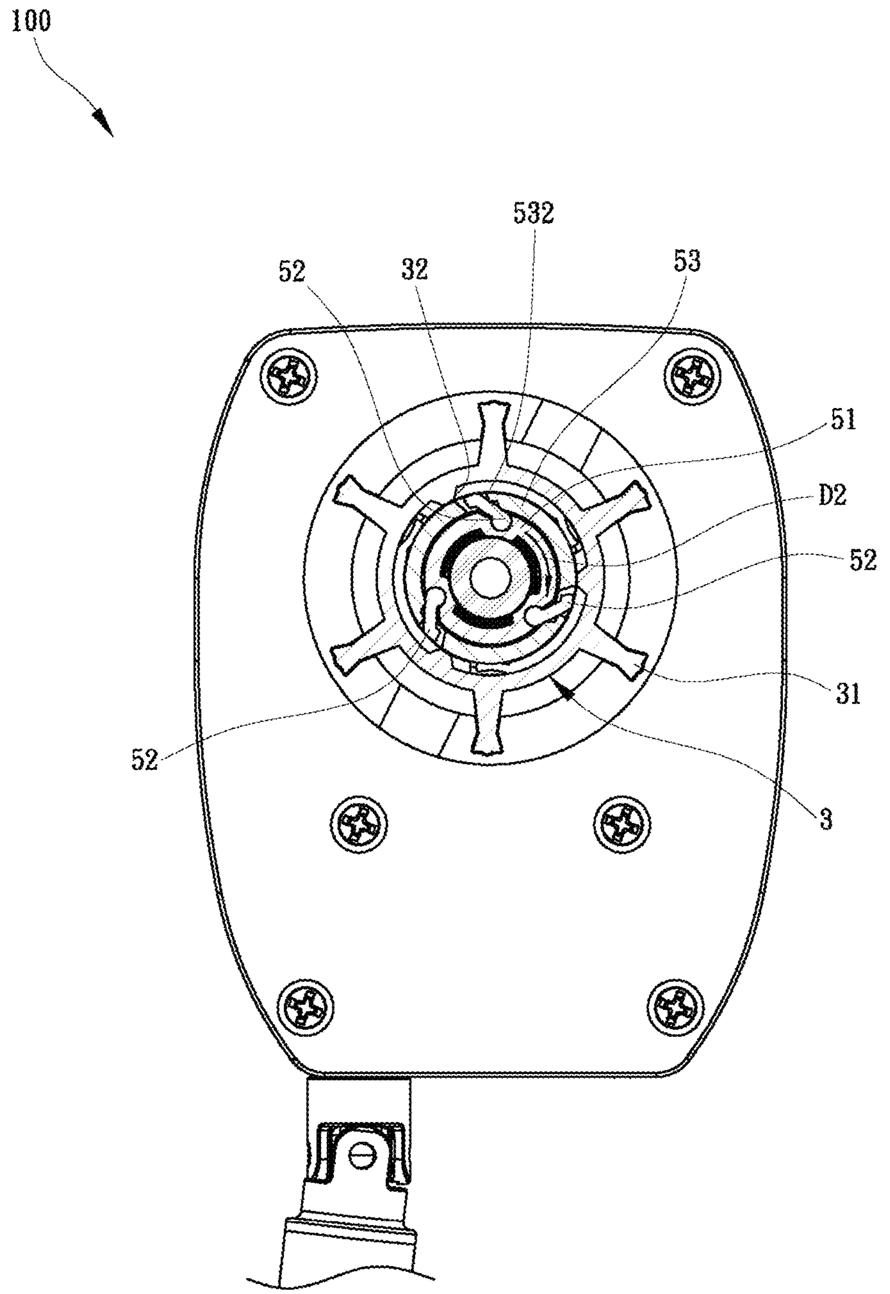
FIG. 14 is schematical view showing actions of the actuating mechanism of the pull-rod mechanism.

Please refer to FIGS. 1-6, and refer to FIGS. 14-16 together. The user can pull down the unlocking shaft 22 to extend and close the window covering 200 of the present disclosure. When the user pulls out the unlocking shaft 22 with respect to the fixed shaft 21, the unlocking shaft 22 drives the moving member 61 to move in the first direction D5 through the unlocking cord 140, making the pushing portion of the moving member 61 (i.e., the pushing element 612) engage with the teeth 4311 on the outer periphery of the driven member 43 and drive the driven member 43 to rotate reversely, and further making the drive shaft 51 rotate reversely concurrently. Since the circumferential length of the positioning rib 511 of the drive shaft 51 is slightly shorter than the circumferential length of the axial groove 531, the rotation amount of each of the swinging pawls 52 (i.e., the first rotation amount) is greater than the rotation amount of the covering sleeve 53 (i.e., the second rotation amount), so that each of the swinging pawls 52 swings to a recessed position where each of the swinging pawls 52 does not protrude from the corresponding one of the through grooves 532, as shown in FIG. 14. Therefore, the swinging pawls 52 disengage from the first abutting portions 32 of the drive connector 3. In this state, the drive connector 3 and the roller 240 can rotate with respect to the drive shaft 51 of the actuating mechanism 5 under the weight of the covering material 260 for downwardly releasing the covering material 260.

Preferably, the window covering 200 further comprises a damping device mounted on the end of the roller 240 rather than one that is fixedly connected to the drive connector 3. Preferably, the damping device is a unidirectional damping device providing a damping force to the roller 240 while the roller 240 rotates under the weight of the covering material 260, thereby lowering the rotation speed of the roller 240 and making the bottom edge of the covering material 260 descend slowly, achieving the effect that the window covering 200 closes in the low speed.

In the present embodiment, once the user stops applying force to the unlocking shaft 22, the return spring 62 applies the restoring elastic force to the moving member 61, which drives the moving member 61 to move in the opposite direction to the first direction D5 for resetting the moving member 61, and also resets the unlocking shaft 22 to the previous position before protrusion through the unlocking cord 140. Since the moving member 61 does not drive the driven member 43 to rotate while being reset, the swinging pawls 52 remain disengaged from the first abutting portions 32 of the drive connector 3, and the roller 240 continuously rotates until the covering material 260 is fully released. In other words, only by pulling the unlocking shaft 22 downward once can the user fully extend the covering material 260. In some other embodiments, each time the user stops applying force to the unlocking shaft, the moving member drives the driven member to rotate forwardly while the moving member is being reset, causing the swinging pawls to swing and protrude from the recessed position, and engage with the first abutting portions of the drive connector. As a result, the roller stops rotating and temporarily stops the release of the covering material. Thereby, the user can intermittently extend the covering material by sections.

The embodiments described above are only some exemplary embodiments of the present disclosure. All equivalent structures which employ the concepts disclosed in this specification and the appended claims should fall within the scope of the present disclosure.

What is claimed is:

1. A pull-rod mechanism applied to a window covering for operating retraction and extension of the window covering, the window covering having a roller and a covering material connected to the roller, the pull-rod mechanism comprising:

a drive connector, fixedly connected to an end of the roller so that the roller is rotatable with the drive connector, the drive connector having an inner surface provided with at least one first abutting portion;

a base, disposed to correspond to the end of the roller;

a pull rod, disposed below the base, comprising:

a fixed shaft, fixedly connected to the base;

an unlocking shaft, at least partially protruding from below the fixed shaft and retractable with respect to the fixed shaft; and a lift operating member, at least partially protruding from below the unlocking shaft and retractable with respect to the unlocking shaft;

a lift mechanism, disposed within the base and in mechanical communication with the lift operating member of the pull rod through a lift cord, comprising:

an annular cord wheel, rotatable around an axial direction of the roller and having an inside circumferential surface formed with plural second abutting portions;

a rewinding unit, connected to the annular cord wheel such that the rewinding unit drives the annular cord wheel to rotate and thereby resets the annular cord wheel after the annular cord wheel stops being subjected to force; and a driven member, coaxially disposed with the annular cord wheel within the base and having an outer periphery formed with plural teeth, the driven member comprising plural elastic arms corresponding to the second abutting portions respectively, wherein an end of the lift cord is fixedly connected to the annular cord wheel while another end of the lift cord extends out from the base into the pull rod and is fixedly connected to the lift operating member; when the lift operating member is subjected to force and thereby protrudes with respect to the unlocking shaft, the lift cord moves with the lift operating member and thereby drives the annular cord wheel to rotate in a forward direction, making the elastic arms abut against the second abutting portions respectively and drive the driven member to rotate in the forward direction with the annular cord wheel concurrently;

an unlocking mechanism, disposed within the base and in mechanical communication with the unlocking shaft of the pull rod through an unlocking cord, comprising:

a moving member, movably disposed within the base and comprising a pushing portion, wherein an end of the unlocking cord is fixedly connected to the moving member while another end of the unlocking cord extends out from the base into the pull rod and is fixedly connected to the unlocking shaft; when the unlocking shaft is subjected to force and thereby protrudes with respect to the fixed shaft, the unlocking cord moves with the unlocking shaft and thereby drives the moving member to move in a first direction, making the pushing portion of the moving member engage with the plural teeth formed on the outer periphery of the driven member and drive the driven member to rotate in a reverse direction opposite to the forward direction; and an actuating mechanism, connected between the lift mechanism and the drive connector, comprising:

a drive shaft, extending along the axial direction of the roller in which an end of the drive shaft extends into the drive connector and another end of the drive shaft is fixedly connected to the driven member such that the drive shaft is rotatable co-directionally with the driven member; and at least one swinging pawl, swingably disposed between the drive shaft and the drive connector;

wherein when the lift operating member is subjected to force and thereby makes the annular cord wheel, the driven member, and the drive shaft rotate in the forward direction, the at least one swinging pawl engages with the at least one first abutting portion of the drive connector and transmits a torque to the roller for retracting the covering material; wherein when the lift operating member stops being subjected to force, the rewinding unit drives the annular cord wheel to rotate in the reverse direction; while the annular cord wheel rotates in the reverse direction, the elastic arms skid over tops of the second abutting portions, and the annular cord wheel does not drive the driven member to rotate;

wherein when the unlocking shaft is subjected to force and thereby protrudes with respect to the fixed shaft and makes the driven member rotate in the reverse direction, the driven member drives the drive shaft of the actuating mechanism to rotate in the reverse direction concurrently, making the at least one swinging pawl disengage from the at least one first abutting portion of the drive connector and configuring the drive connector and the roller to rotate freely with respect to the drive shaft under a weight of the covering material for extending the covering material.

2. The pull-rod mechanism of claim 1, wherein the unlocking mechanism further comprises at least one return spring disposed between the base and the moving member; when the unlocking shaft is subjected to force and thereby protrudes with respect to the fixed shaft and makes the moving member move in the first direction through the unlocking cord, the at least one return spring undergoes elastic deformation; when the unlocking shaft stops being subjected to force, the at least one return spring applies a restoring elastic force to the moving member for resetting the moving member; while the moving member is reset, the pushing portion of the moving member skids over tops of the plural teeth formed on the outer periphery of the driven member, and the moving member does not drive the driven member to rotate.

3. The pull-rod mechanism of claim 2, wherein the moving member further comprises:

a main body, having a recess and a blocking edge; and a pushing element, having a fixed end and an engaging end opposite to the fixed end, wherein the fixed end is disposed within the recess of the main body, and the engaging end is swingable in a deflecting direction with respect to the fixed end; wherein the pushing portion of the moving member is located on the engaging end of the pushing element.

4. The pull-rod mechanism of claim 2, wherein the pushing portion of the moving member is a rack structure with plural right-angle teeth.

5. The pull-rod mechanism of claim 1, wherein the base has a post, and after the unlocking cord extends out from the end of the unlocking cord fixedly connected to the moving member, the unlocking cord goes around a curved surface on the post before extending out from the base into the pull rod and being fixedly connected to the unlocking shaft.

6. The pull-rod mechanism of claim 1, wherein the actuating mechanism further comprises a covering sleeve, which is sleeved on the drive shaft and has an axial groove and at least one through groove; the drive shaft has a positioning rib embedded into the axial groove of the covering sleeve; the positioning rib abuts against one of two side walls of the axial groove according to different rotation directions of the drive shaft for driving the covering sleeve to rotate; when the drive shaft is driven by the driven member to rotate in the reverse direction, a first rotation amount of the at least one swinging pawl is greater than a second rotation amount of the covering sleeve, so that the at least one swinging pawl swings to a recessed position where the at least one swinging pawl does not protrude from the at least one through groove and disengages from the at least one first abutting portion of the drive connector, thereby allowing the roller to be rotatable with respect to the covering sleeve of the actuating mechanism for extending the covering material.

7. The pull-rod mechanism of claim 6, wherein the actuating mechanism further comprises a braking spring, and the base comprises a tubular shell structure; an end of the tubular shell structure is provided with a barrier; the braking spring is sleeved on the covering sleeve, in which an end of the braking spring abuts against the barrier of the tubular shell structure, and another end of the braking spring extends into the axial groove of the covering sleeve and is hooked on the positioning rib of the drive shaft; when the at least one swinging pawl has engaged with the at least one first abutting portion of the drive connector, and the drive connector and the roller tend to rotate in the reverse direction under the weight of the covering material, the braking spring provides a resistance force to the roller.

8. The pull-rod mechanism of claim 1, wherein the base comprises a spring-storage pillar, and the rewinding unit comprises:

a spring-storage wheel, rotatably sleeved on the spring-storage pillar of the base and operatively connected with the annular cord wheel so that the spring-storage wheel is rotatable with the annular cord wheel; and a coil spring, wherein an end of the coil spring is fixed on the spring-storage pillar of the base, another end of the coil spring is fixed on the spring-storage wheel, and the coil spring is roughly wound around the spring-storage pillar; wherein when the spring-storage wheel rotates with respect to the spring-storage pillar, the coil spring is contracted or loosened correspondingly to different rotation directions of the spring-storage wheel;

wherein when the lift operating member is subjected to force and thereby protrudes with respect to the unlocking shaft and makes the annular cord wheel rotate in the forward direction, the annular cord wheel drives the spring-storage wheel to rotate in an energy-storage direction and the coil spring is thereby gradually contracted; when the lift cord stops being subjected to force, the coil spring provides a rewinding elastic force to the spring-storage wheel such that the spring-storage wheel rotates in a direction opposite to the energy-storage direction and drives the annular cord wheel to rotate in the reverse direction, and the coil spring wound around the spring-storage pillar is thereby gradually loosened.

9. The pull-rod mechanism of claim 1, wherein the driven member further comprises:

a main portion, allowing the elastic arms of the driven member to swing with respect to the main portion respectively; and plural elastic supporting pieces, disposed to correspond to the elastic arms in location respectively for ensuring that the elastic arms protrude towards the second abutting portions and engage with the second abutting portions while the annular cord wheel rotates in the forward direction; wherein each of the elastic supporting pieces has a first end integrally connected to a corresponding one of the elastic arms and a second end abutting against the main portion.

10. The pull-rod mechanism of claim 1, wherein the driven member further comprises:

a main portion, allowing the elastic arms of the driven member to be swingable with respect to the main portion respectively; and plural elastic supporting pieces, disposed to correspond to the elastic arms in location respectively for ensuring that the elastic arms protrude towards the second abutting portions and engage with the second abutting portions while the annular cord wheel rotates in the forward direction; wherein each of the elastic supporting pieces has a first end integrally connected to the main portion and a second end abutting against a corresponding one of the elastic arms.

11. A window covering, comprising:

a roller;

a covering material, wherein an end of the covering material is connected to the roller so that the covering material is configured to be retracted or extended by the roller; and the pull-rod mechanism as defined in claim 1.

12. The window covering of claim 11, wherein the unlocking mechanism further comprises at least one return spring disposed between the base and the moving member; when the unlocking shaft is subjected to force and thereby protrudes with respect to the fixed shaft and makes the moving member move in the first direction through the unlocking cord, the at least one return spring undergoes elastic deformation; when the unlocking shaft stops being subjected to force, the at least one return spring applies a restoring elastic force to the moving member for resetting the moving member; while the moving member is reset, the pushing portion of the moving member skids over tops of the plural teeth formed on the outer periphery of the driven member, and the moving member does not drive the driven member to rotate.

13. The window covering of claim 11, wherein the moving member further comprises:

a main body, having a recess and a blocking edge; and a pushing element, having a fixed end and an engaging end opposite to the fixed end, wherein the fixed end is disposed within the recess of the main body, and the engaging end is swingable in a deflecting direction with respect to the fixed end; wherein the pushing portion of the moving member is located on the engaging end of the pushing element.

* * * * *